(12) United States Patent
Spector et al.

(10) Patent No.: US 8,464,822 B2
(45) Date of Patent: Jun. 18, 2013

(54) PERSONAL VEHICLE

(75) Inventors: Razi Spector, Yokneam (IL); Yochai Tenenbaum, Rosh-Pina (IL)

(73) Assignee: eVo Way, Rosh Pina (IL)

( * ) Notice: Subject to any disclaimer, the term of this patent is extended or adjusted under 35 U.S.C. 154(b) by 108 days.

(21) Appl. No.: 12/929,186

(22) Filed: Jan. 6, 2011

(65) Prior Publication Data
US 2012/0175179 A1 Jul. 12, 2012

(51) Int. Cl.
*B60B 3/00* (2006.01)
*B62K 11/00* (2006.01)

(52) U.S. Cl.
USPC ............ 180/219; 180/181; 280/87.041

(58) Field of Classification Search
USPC ........... 180/219, 180, 181, 7.1, 21; 280/63, 280/11.227, 87.041
See application file for complete search history.

(56) References Cited

U.S. PATENT DOCUMENTS

| | | | | |
|---|---|---|---|---|
| 2,054,965 A | * | 9/1936 | Clo | 152/427 |
| 2,281,359 A | * | 4/1942 | Kenner | 152/209.8 |
| 2,621,700 A | * | 12/1952 | Snyder | 152/427 |
| 2,843,426 A | | 7/1958 | Takeo et al. | |
| 2,931,012 A | * | 3/1960 | Kosach | 362/464 |
| 2,996,306 A | * | 8/1961 | Johnson | 280/11.115 |
| 3,663,031 A | * | 5/1972 | Young | 280/11.24 |
| 3,885,804 A | * | 5/1975 | Cudmore | 280/11.204 |
| 4,045,096 A | | 8/1977 | Lidov | |
| 4,363,493 A | * | 12/1982 | Veneklasen | 280/11.204 |
| 5,071,196 A | | 12/1991 | Sbarro | |
| 5,490,719 A | * | 2/1996 | Lew | 301/5.1 |
| 5,779,247 A | * | 7/1998 | Anselmo | 280/11.24 |
| 5,826,674 A | | 10/1998 | Taylor | |
| 5,975,229 A | | 11/1999 | Hosoda | |
| 6,234,042 B1 | * | 5/2001 | An | 74/551.5 |
| 6,273,437 B1 | | 8/2001 | Lovitt et al. | |
| 6,705,630 B1 | | 3/2004 | Karpman | |
| 6,926,294 B2 | | 8/2005 | Lewis | |
| 7,246,809 B2 | | 7/2007 | Rutkowski | |
| 7,669,681 B2 | | 3/2010 | Lee | |
| 7,980,568 B2 | * | 7/2011 | Chen | 280/11.24 |
| 8,113,524 B2 | * | 2/2012 | Karpman | 280/63 |
| 2004/0036248 A1 | | 2/2004 | Karpman | |

FOREIGN PATENT DOCUMENTS

| | | |
|---|---|---|
| CN | 201308758 | 9/2009 |
| DE | 365513 | 12/1922 |
| DE | 19531253 | 2/1997 |
| FR | 2556228 | 6/1995 |
| GB | 1245970 | 9/1971 |
| WO | WO9703735 | 2/1997 |

* cited by examiner

*Primary Examiner* — Anne Marie M Boehler
(74) *Attorney, Agent, or Firm* — Eitan, Mehulal & Sadot

(57) ABSTRACT

The present invention relates to components, arrangements and assembly of a personal vehicle and methods for producing same. According to some embodiments of the present invention, there may be provided a personal vehicle including one or more "hubless wheels". According to further embodiments of the present invention, a HWPV may further include one or more footstands mounted such that they reside within the center of the hubless wheels, such that a rider of the HWPV standing on the footstands is essentially standing with his/her feet within the wheels of the HWPV.

17 Claims, 45 Drawing Sheets

HWPV (100) – right side

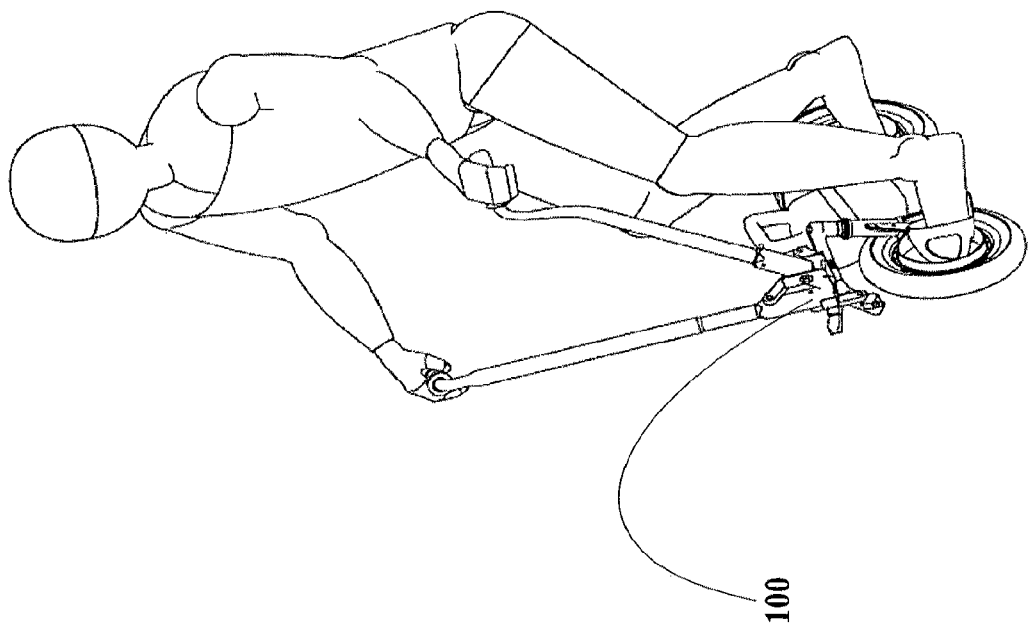
Fig. 1A - HWPV (100)
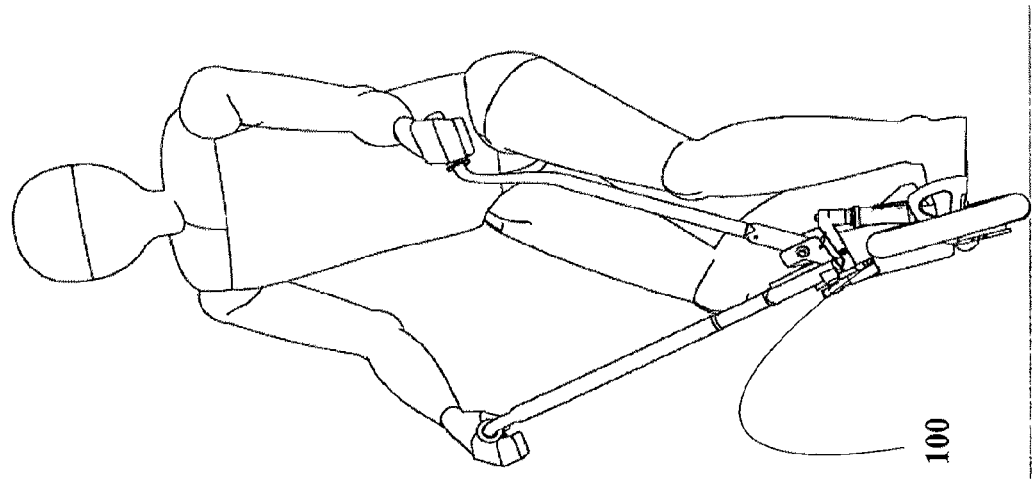

Fig. 1B - HWPV (100) – right side
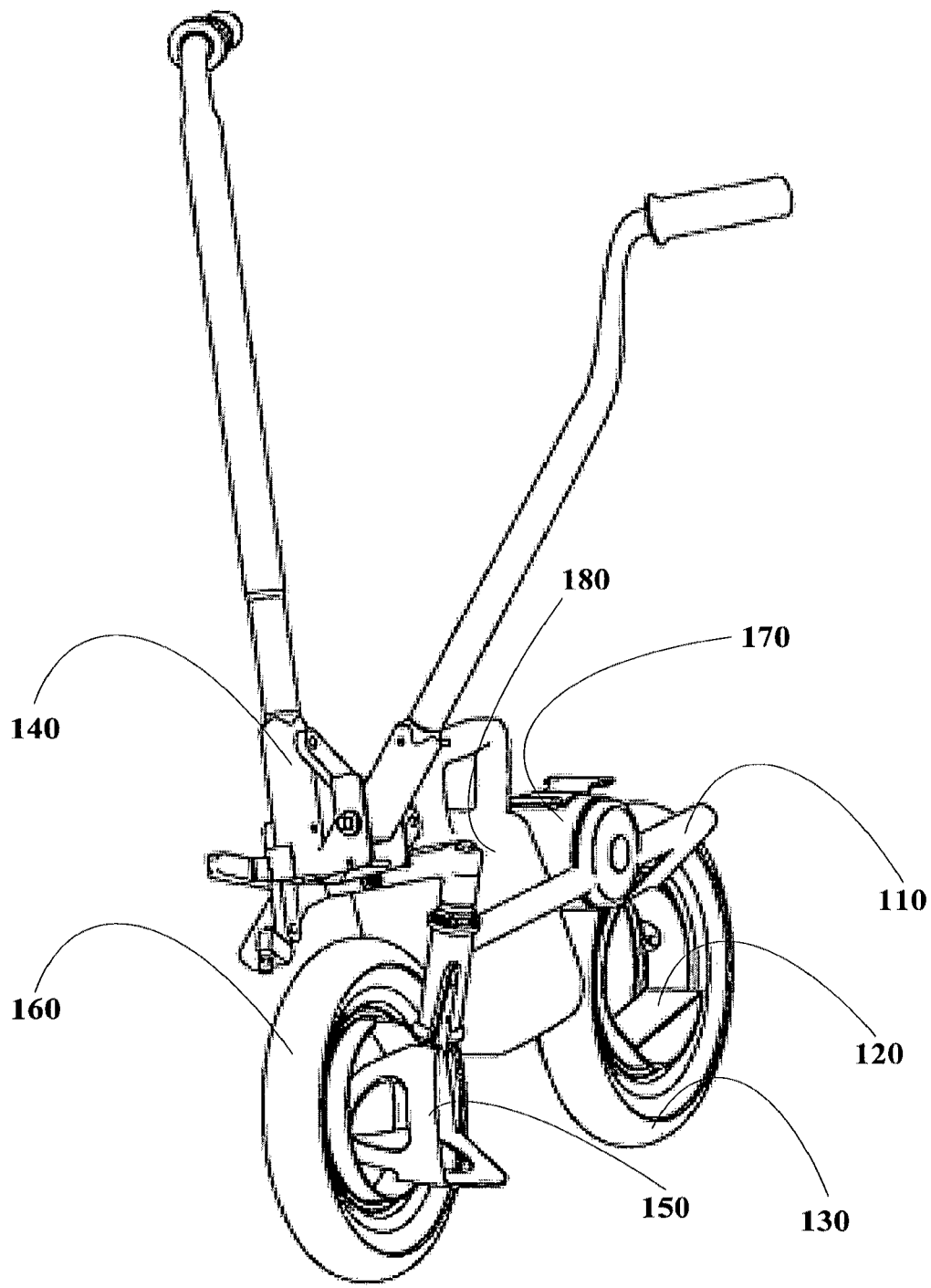

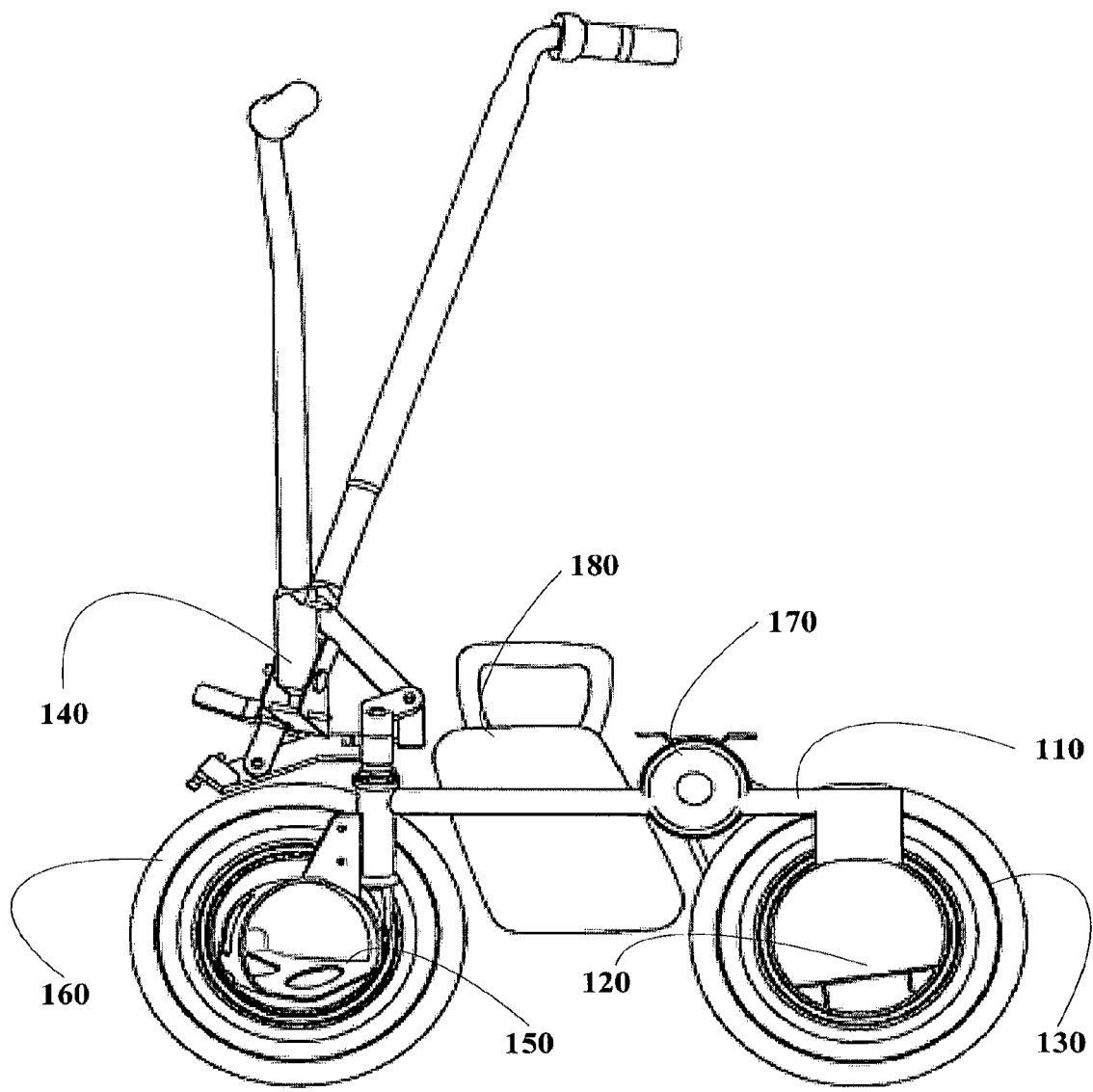
Fig. 1C - HWPV (100) – left Side

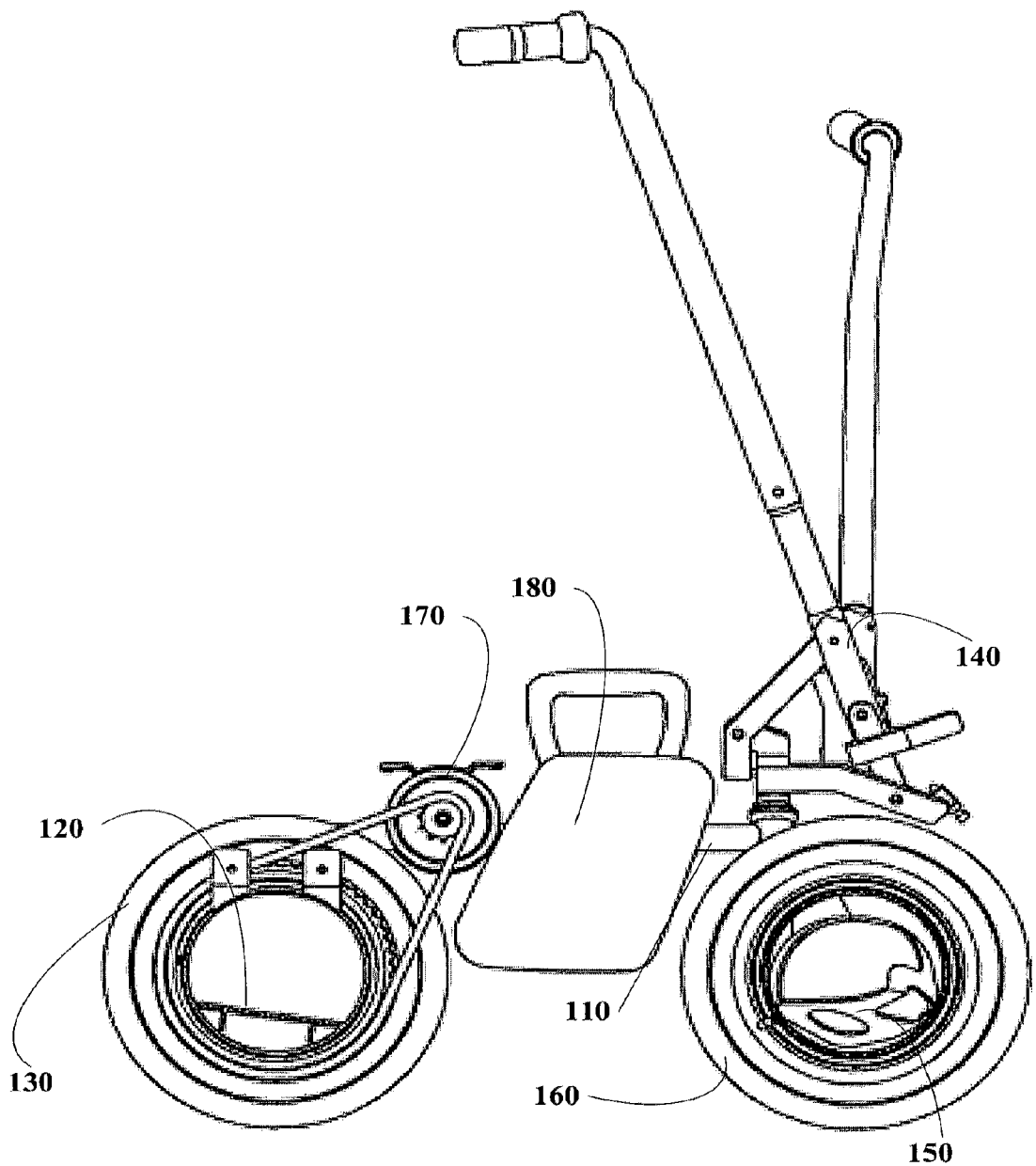

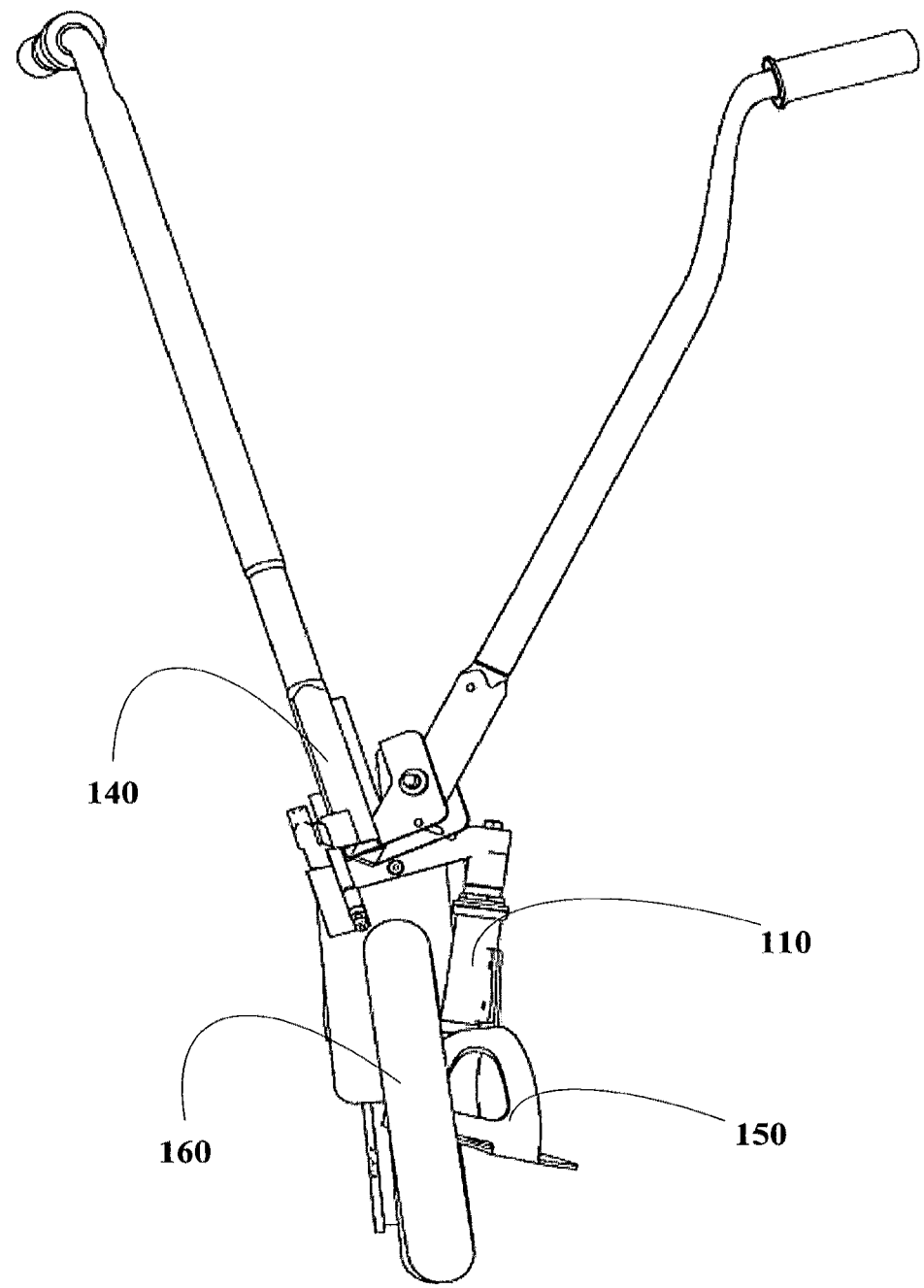
Fig. 1E - HWPV (100) - Front

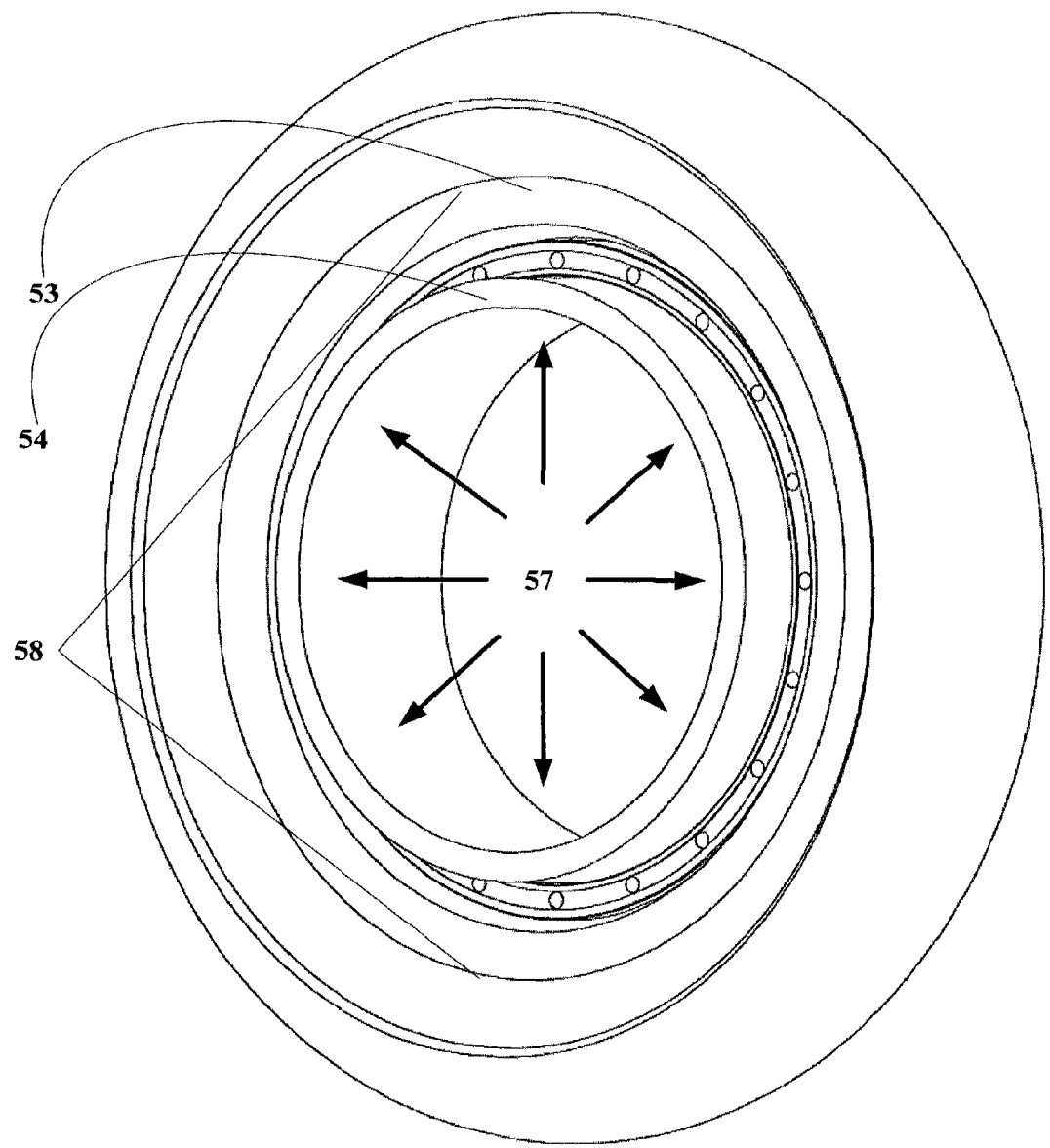
Fig. 2 - Hubless Wheel (50)

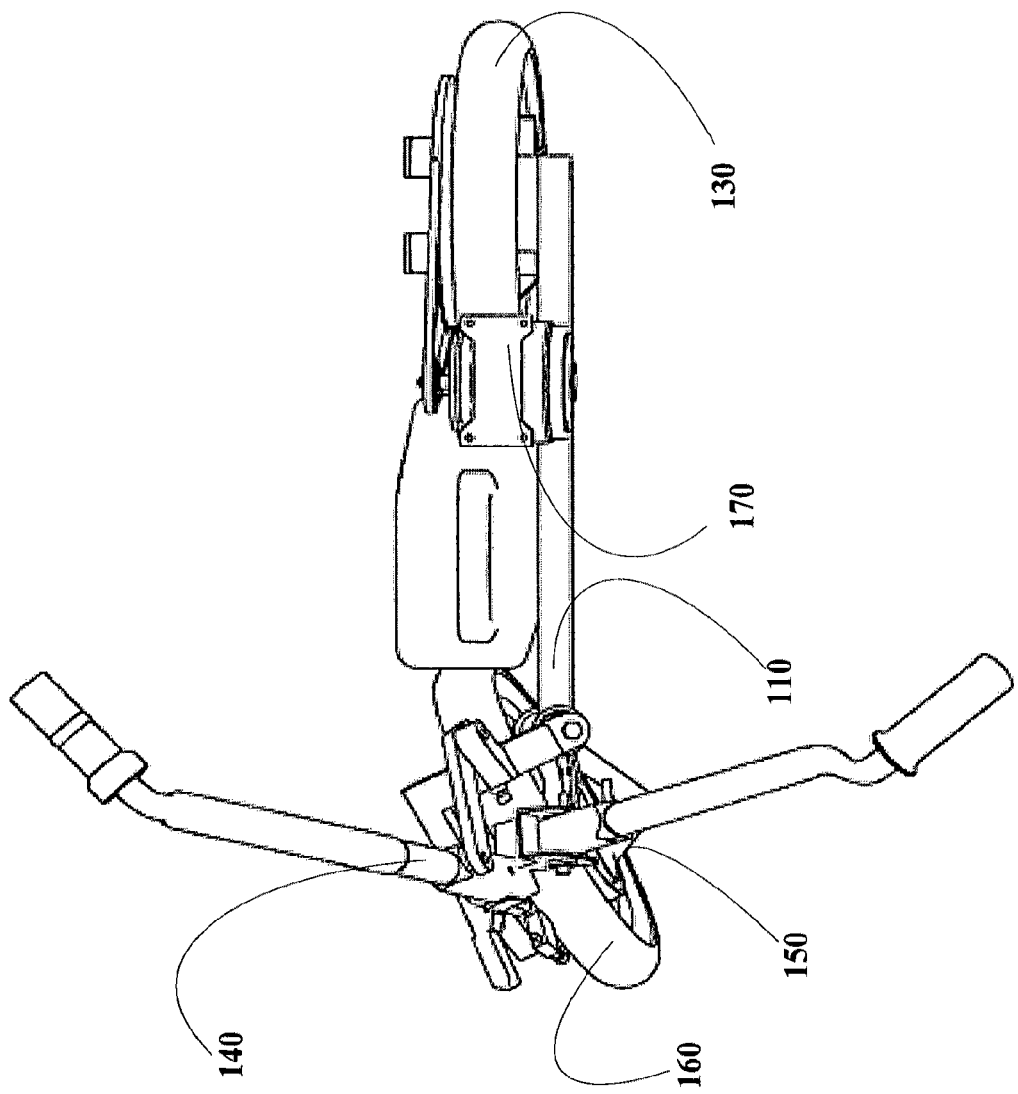
Fig. 3L - HWPV (100) – top turning left

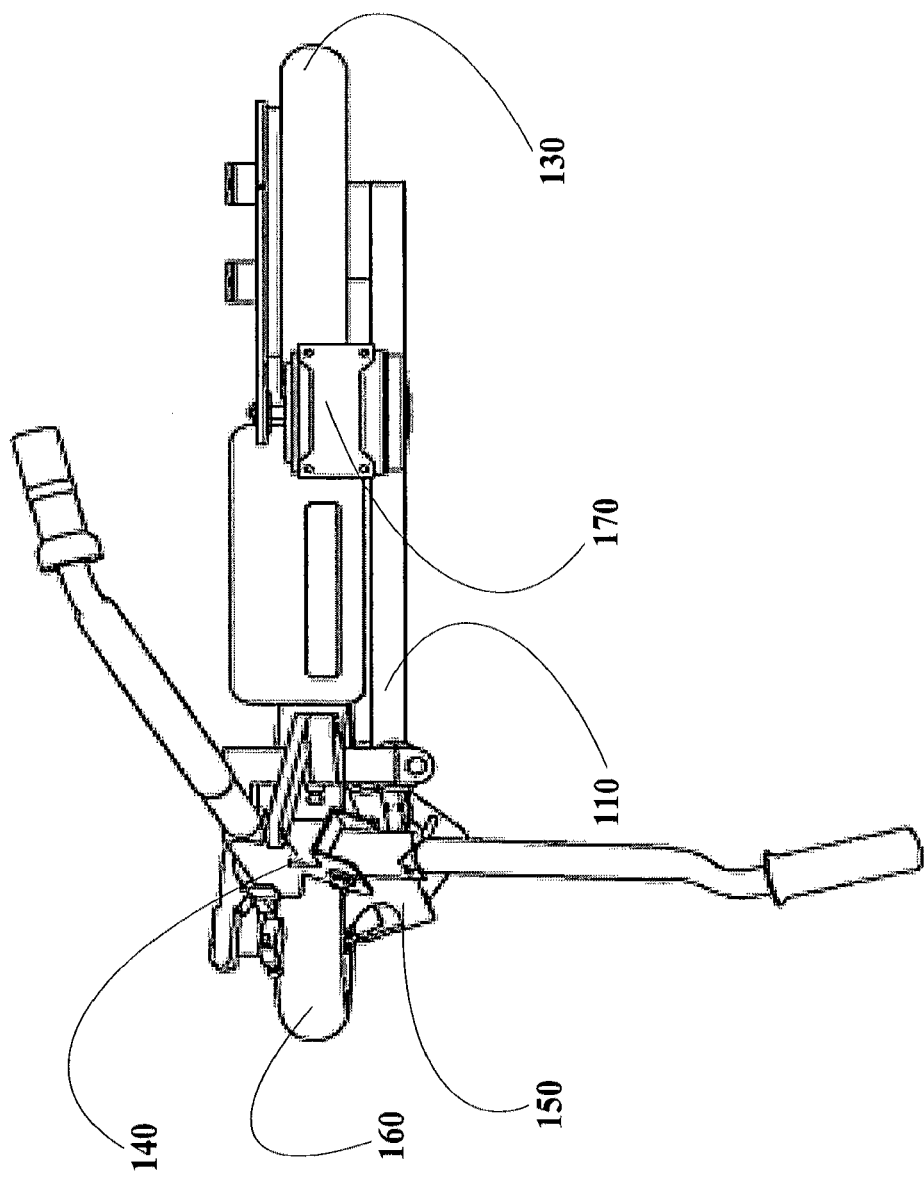
Fig. 3S - HWPV (100) – top going straight

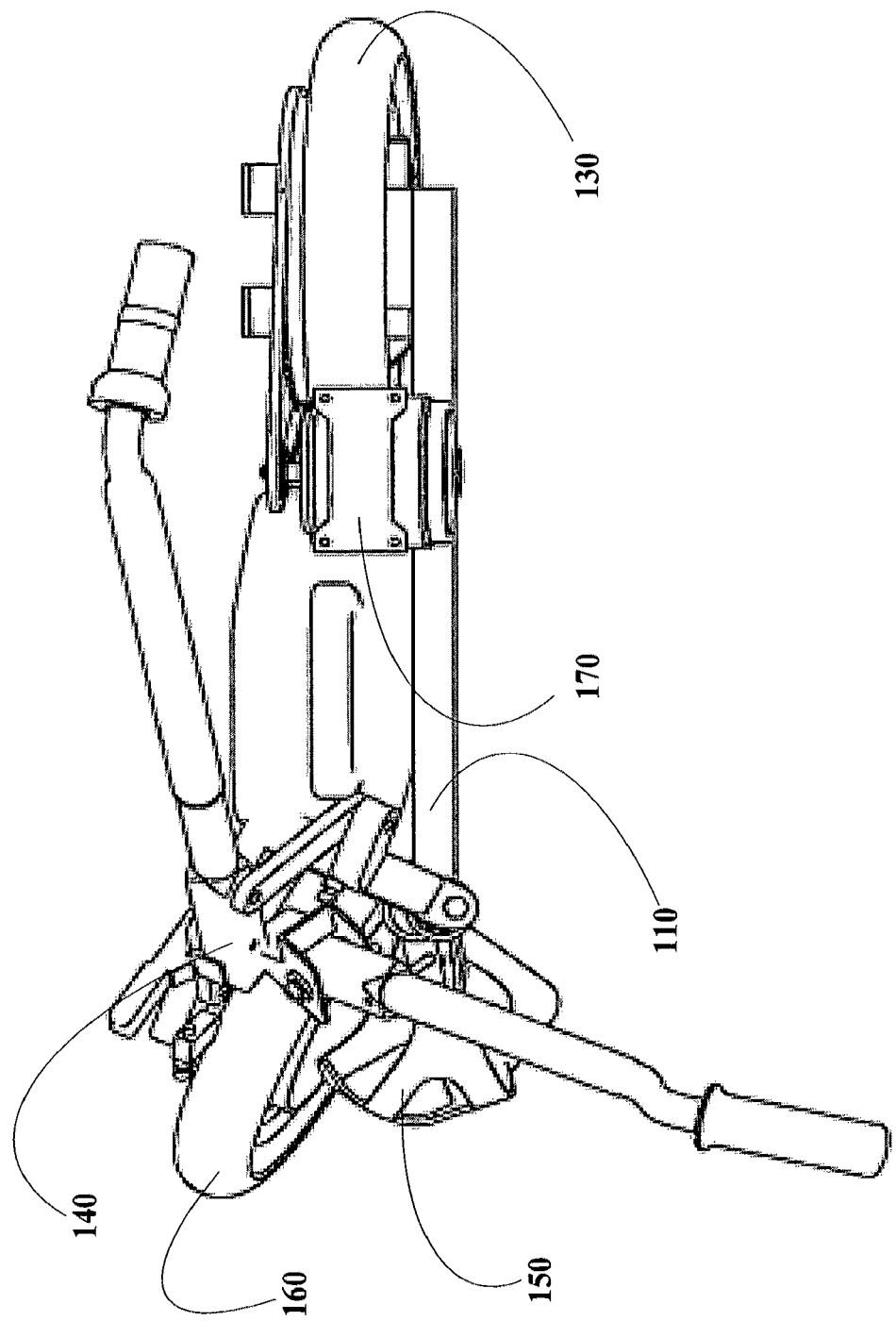
Fig. 3R - HWPV (100) – top turning right

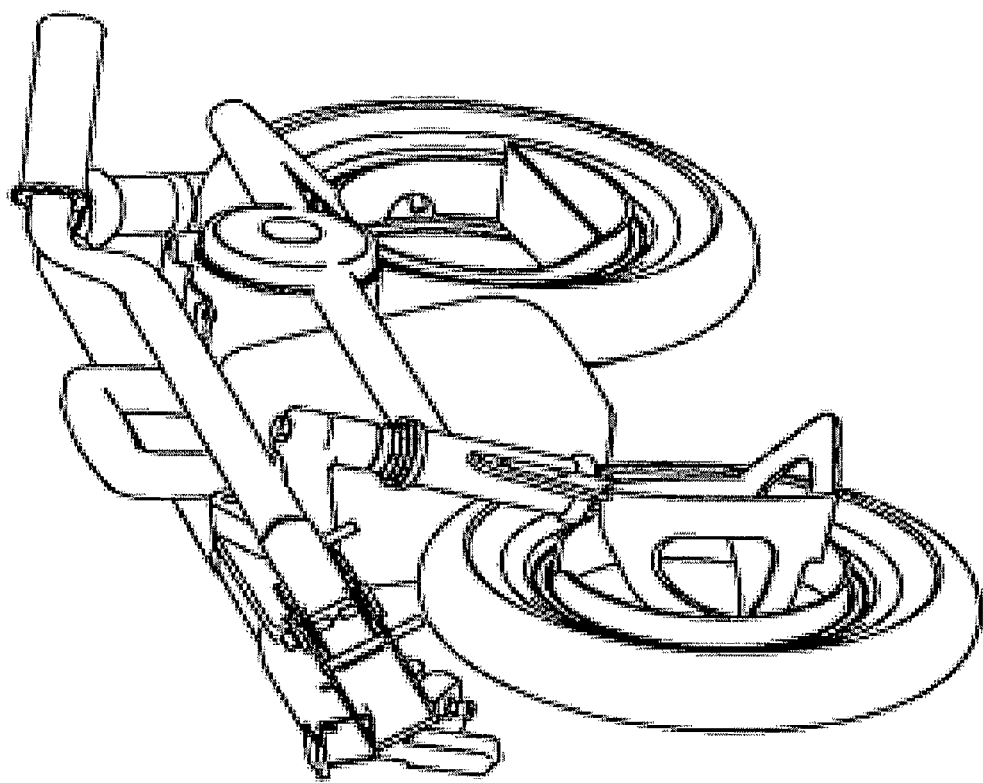
Fig. 4A - HWPV (100) – folded

Fig. 4B - HWPV (100) – folded
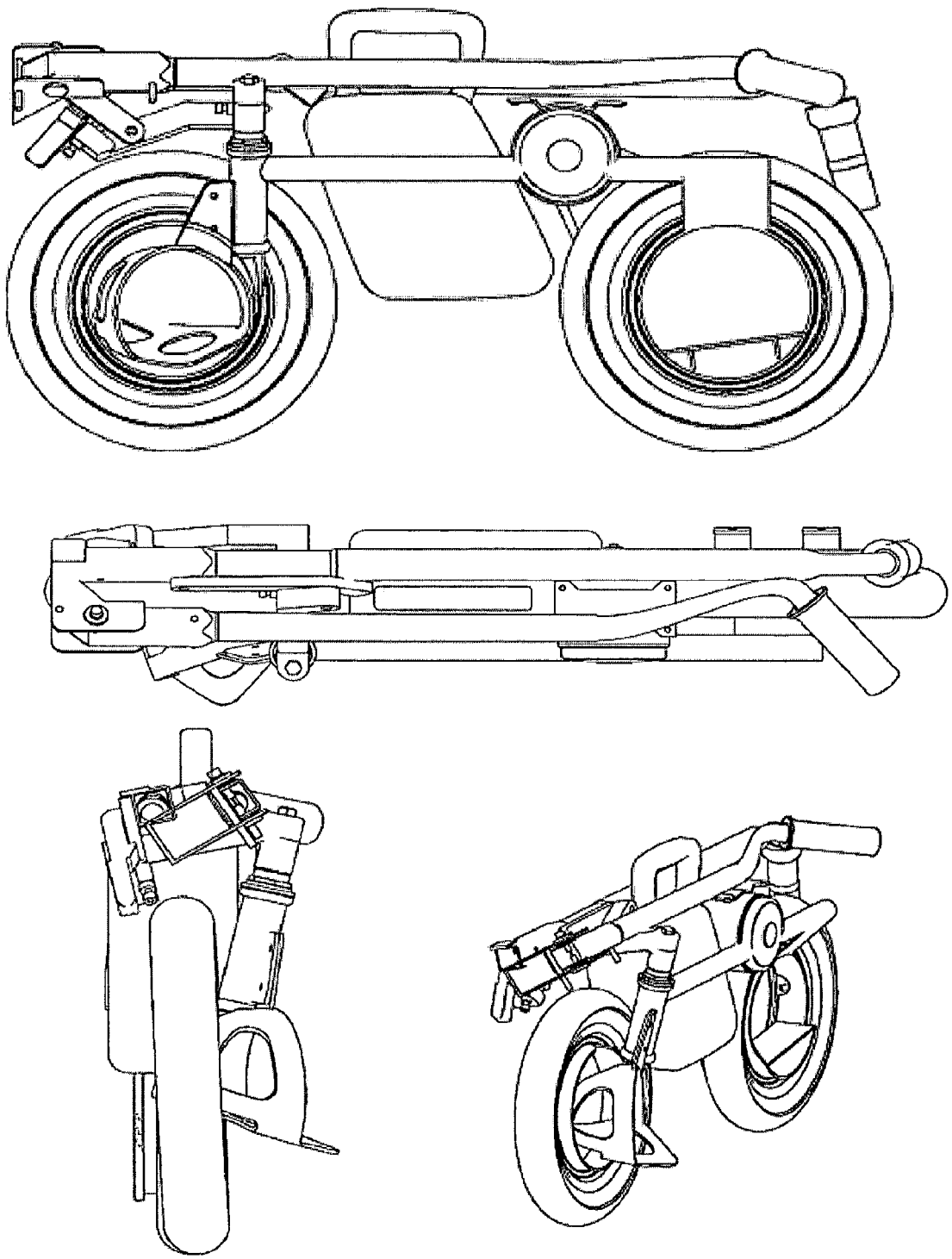

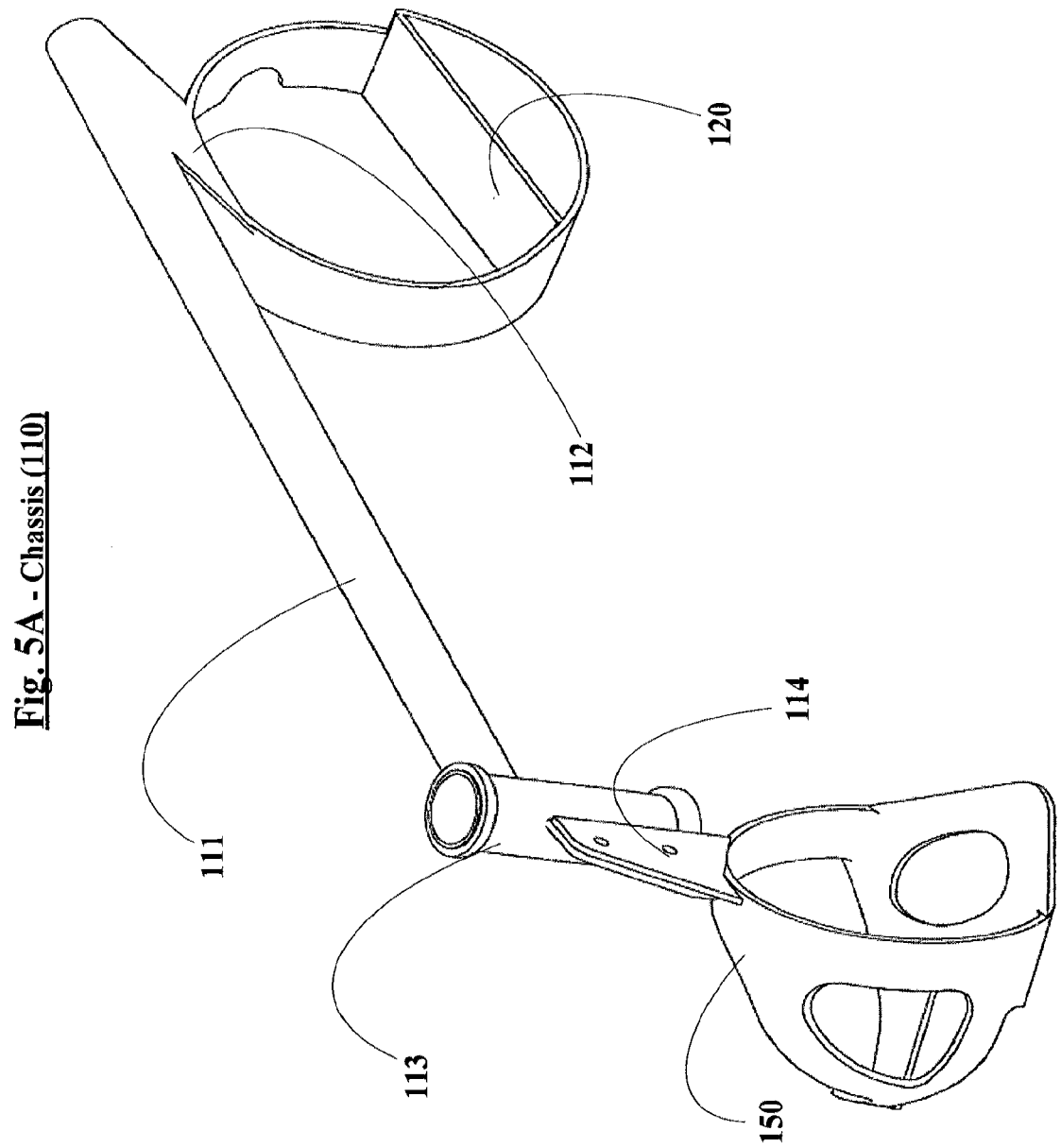

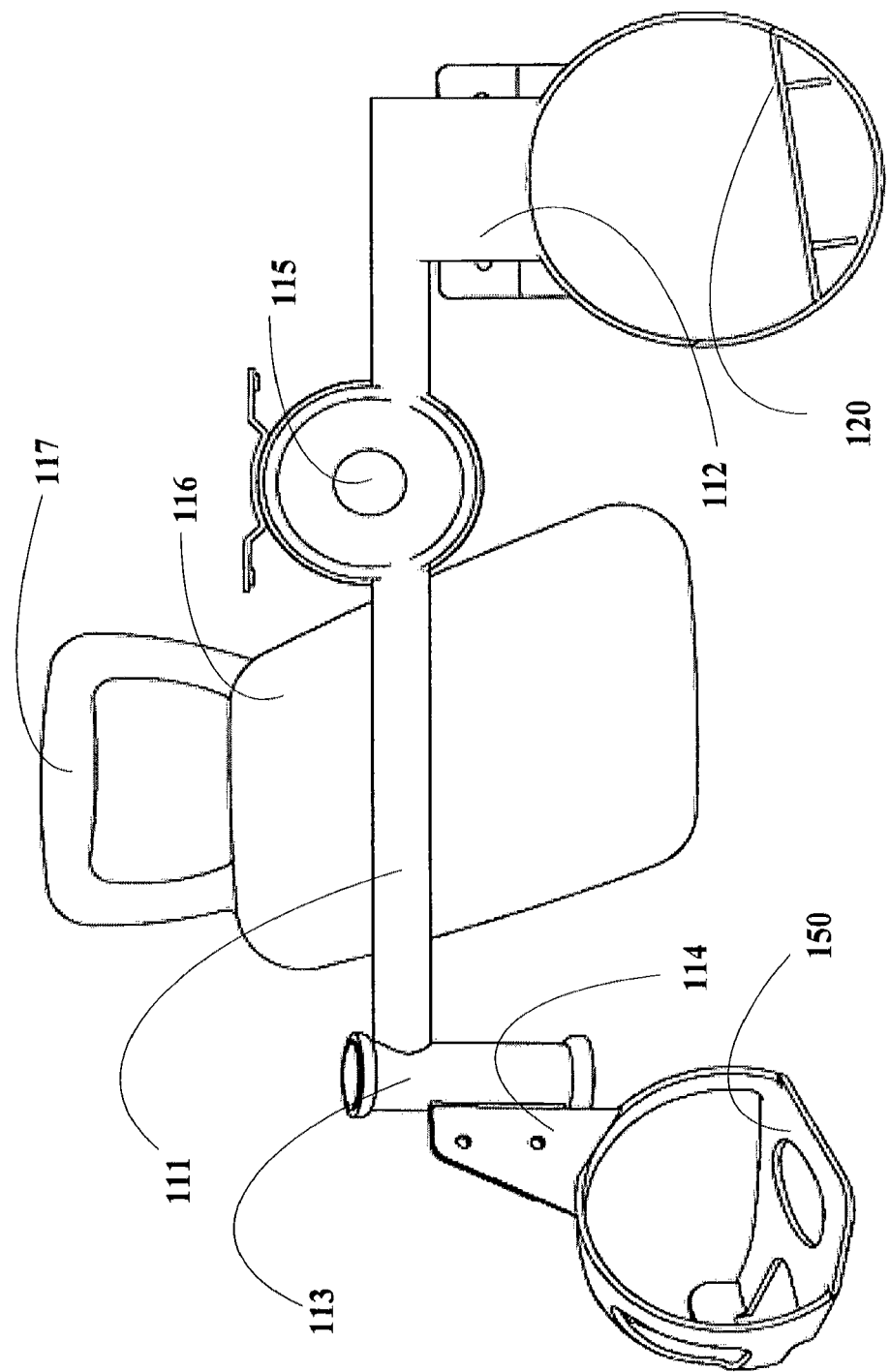
Fig. 5B - Chassis (110)

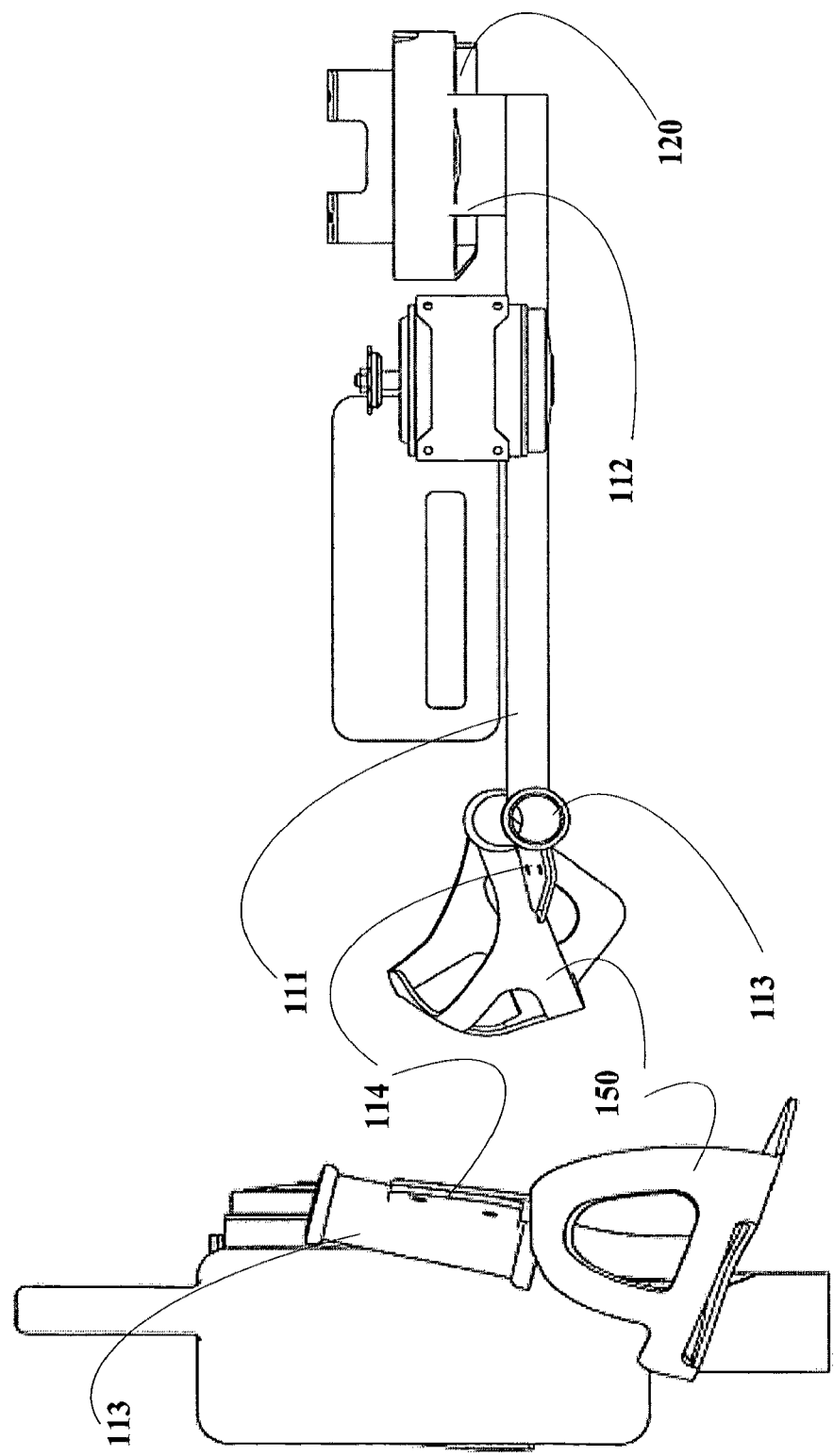
Fig. 5C - Chassis (110)

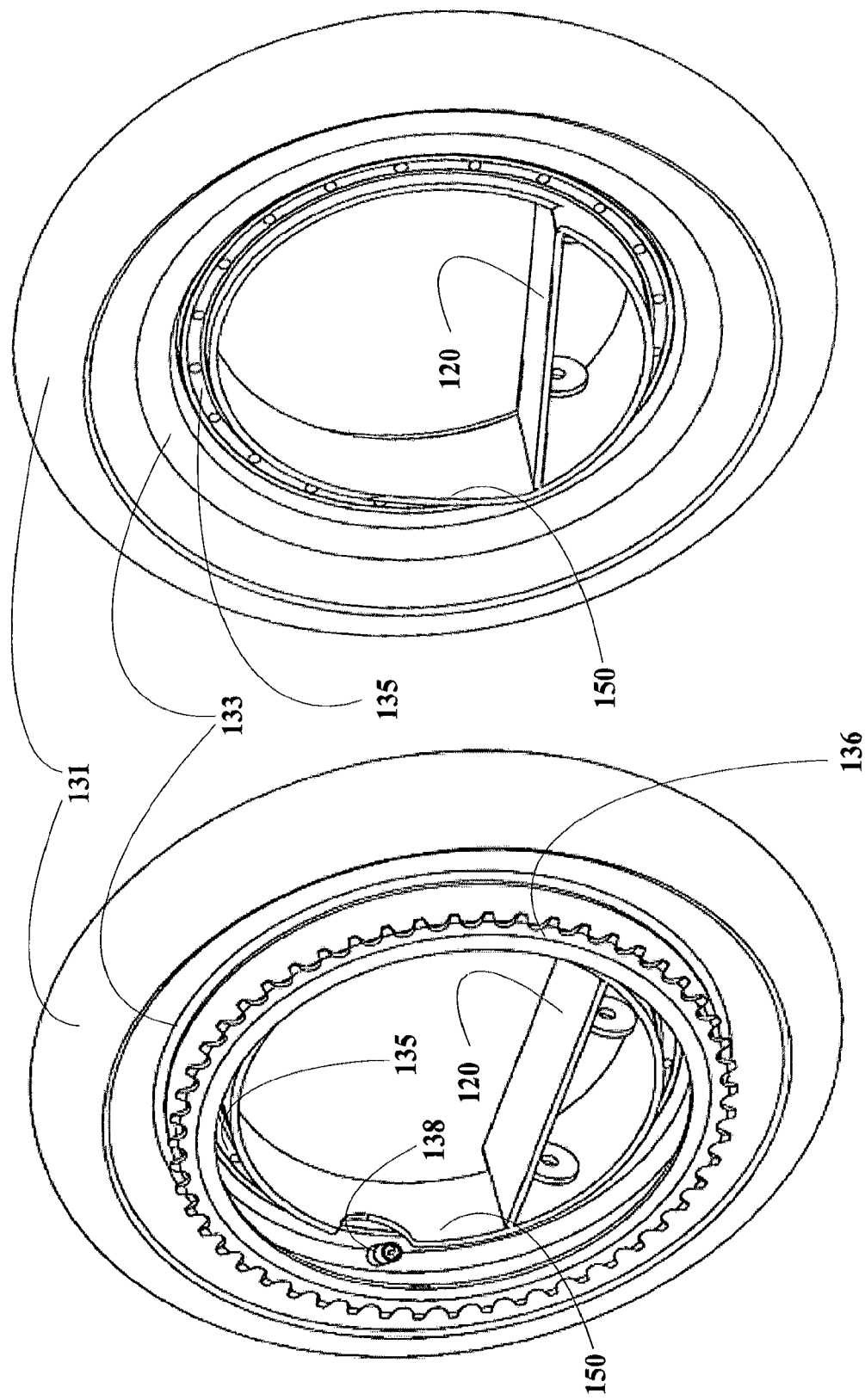
Fig. 6A - Rear Hubless Wheel (130)

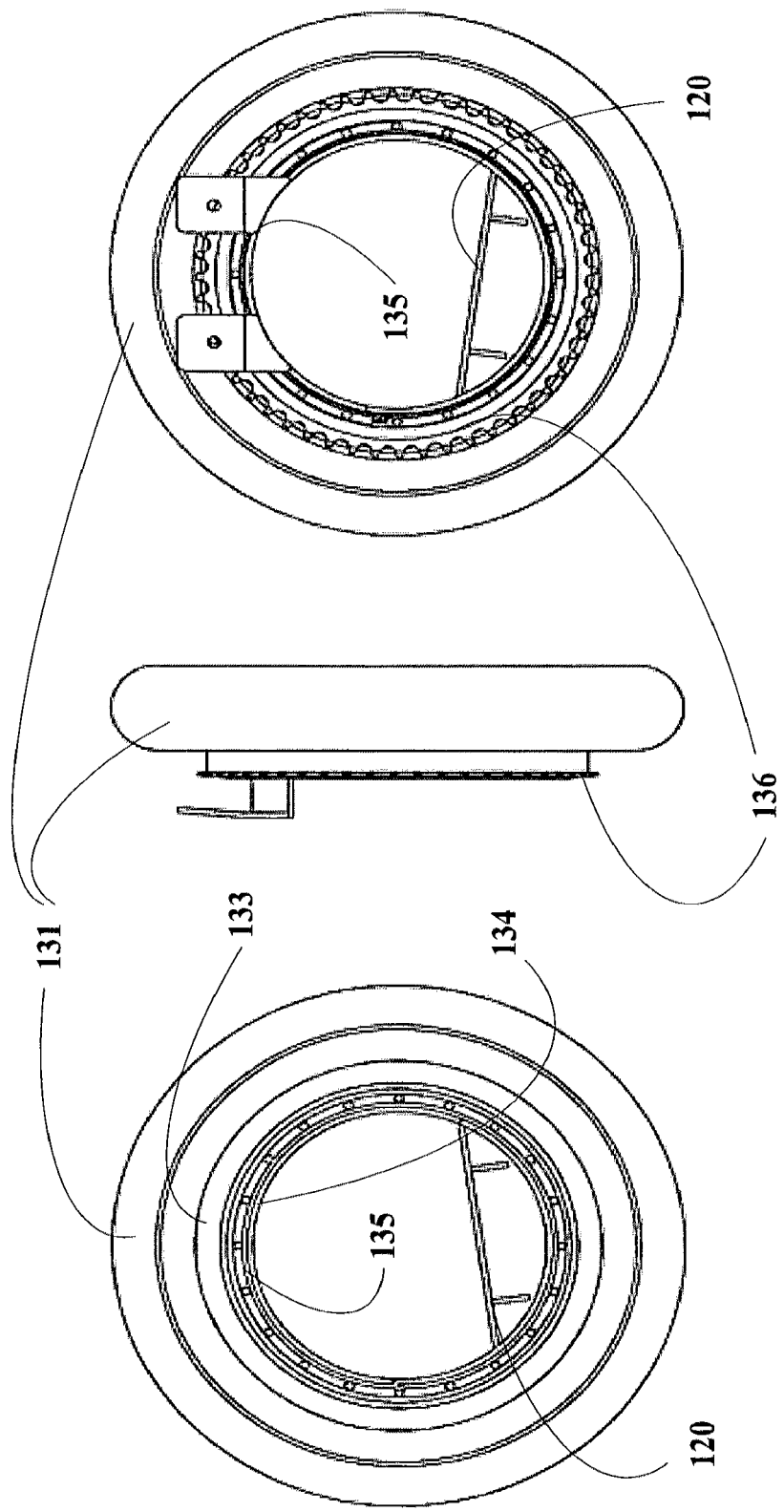
Fig. 6B - Rear Hubless Wheel (130)

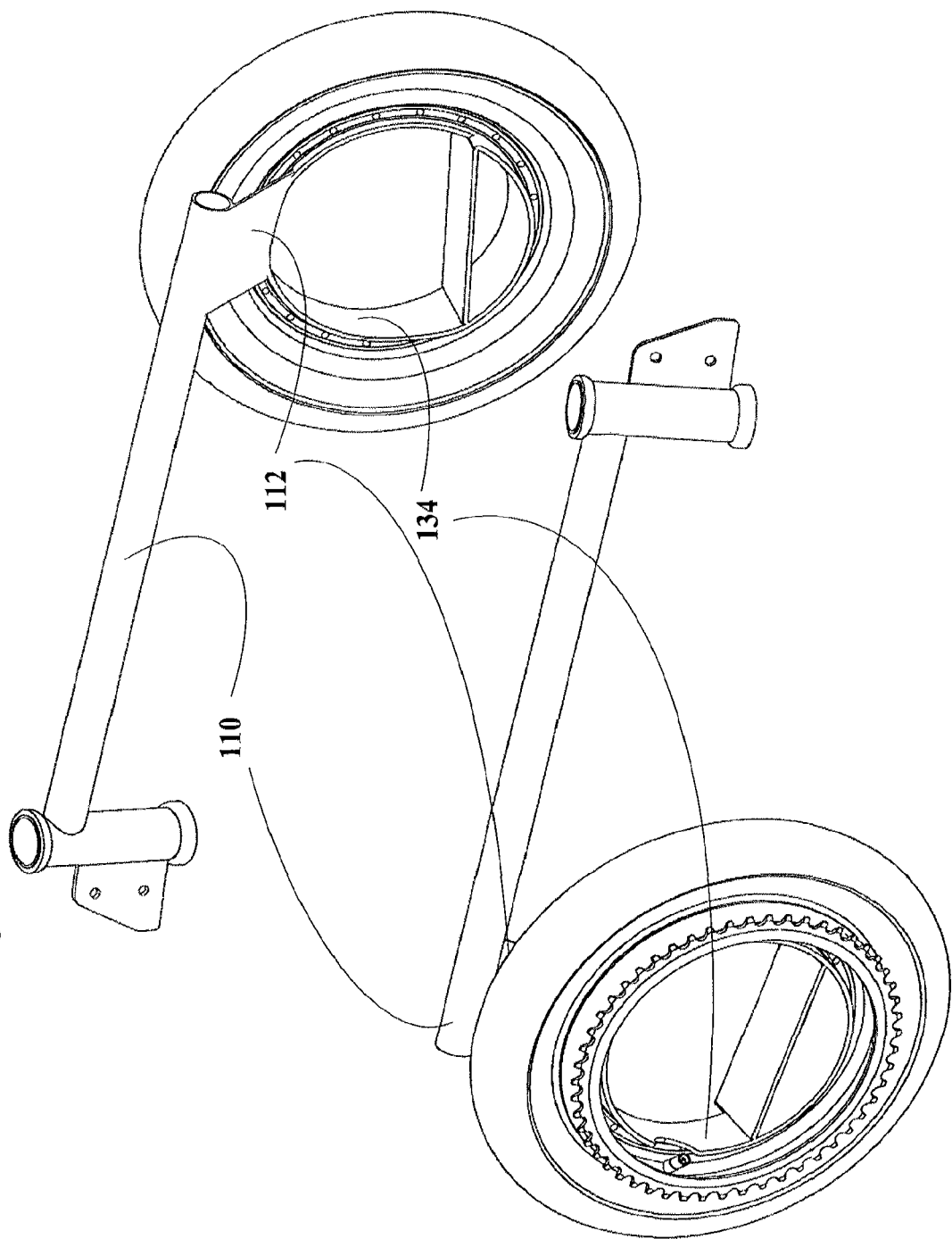

Fig. 6D - Rear Hubless Wheel (130) connected to Propulsion System (170)
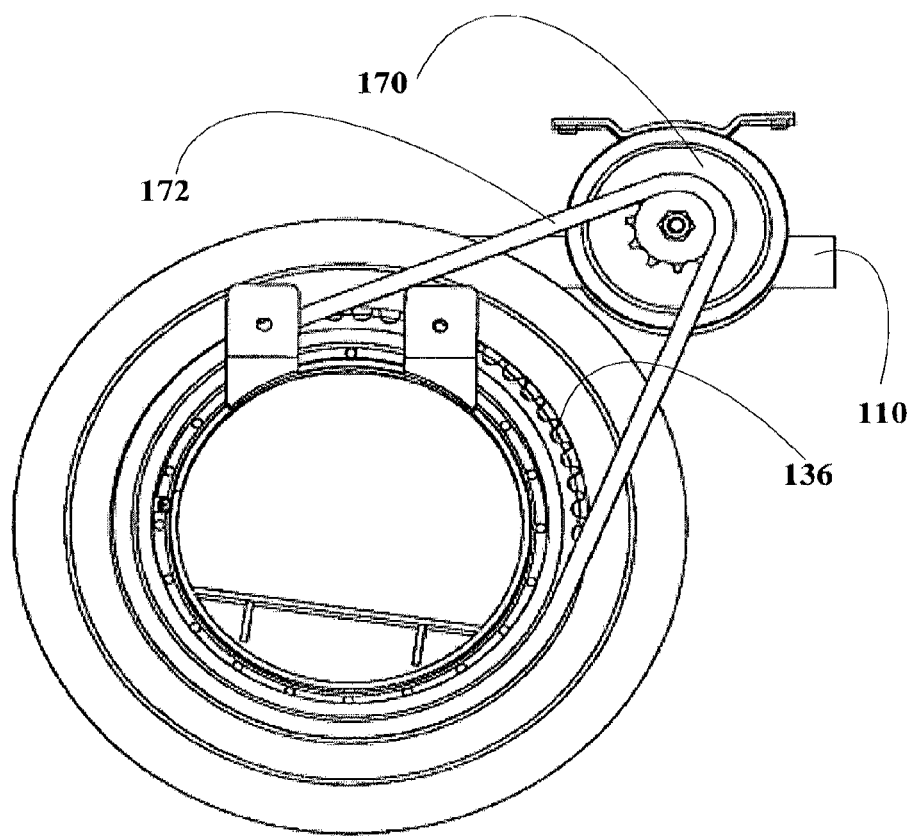

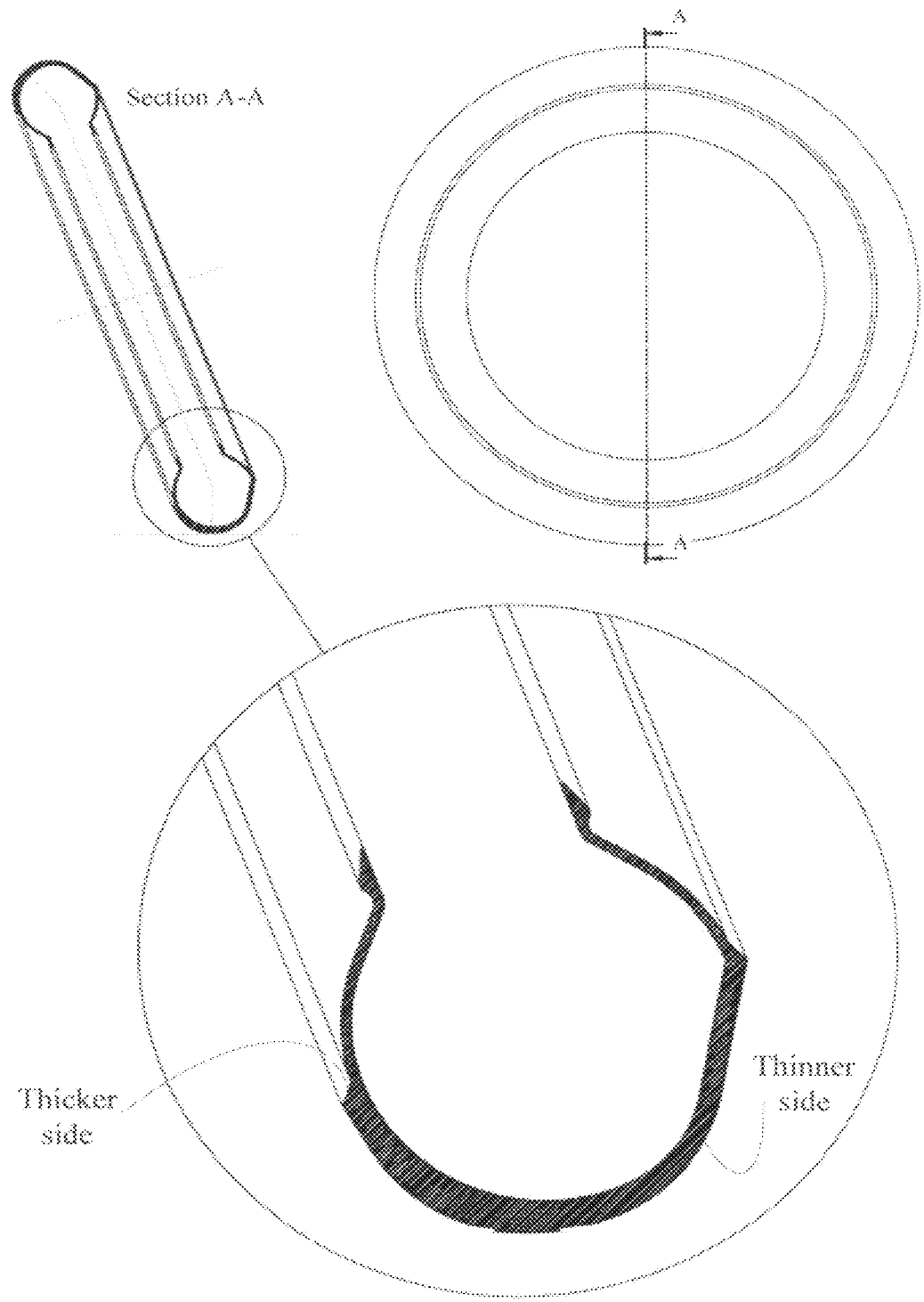

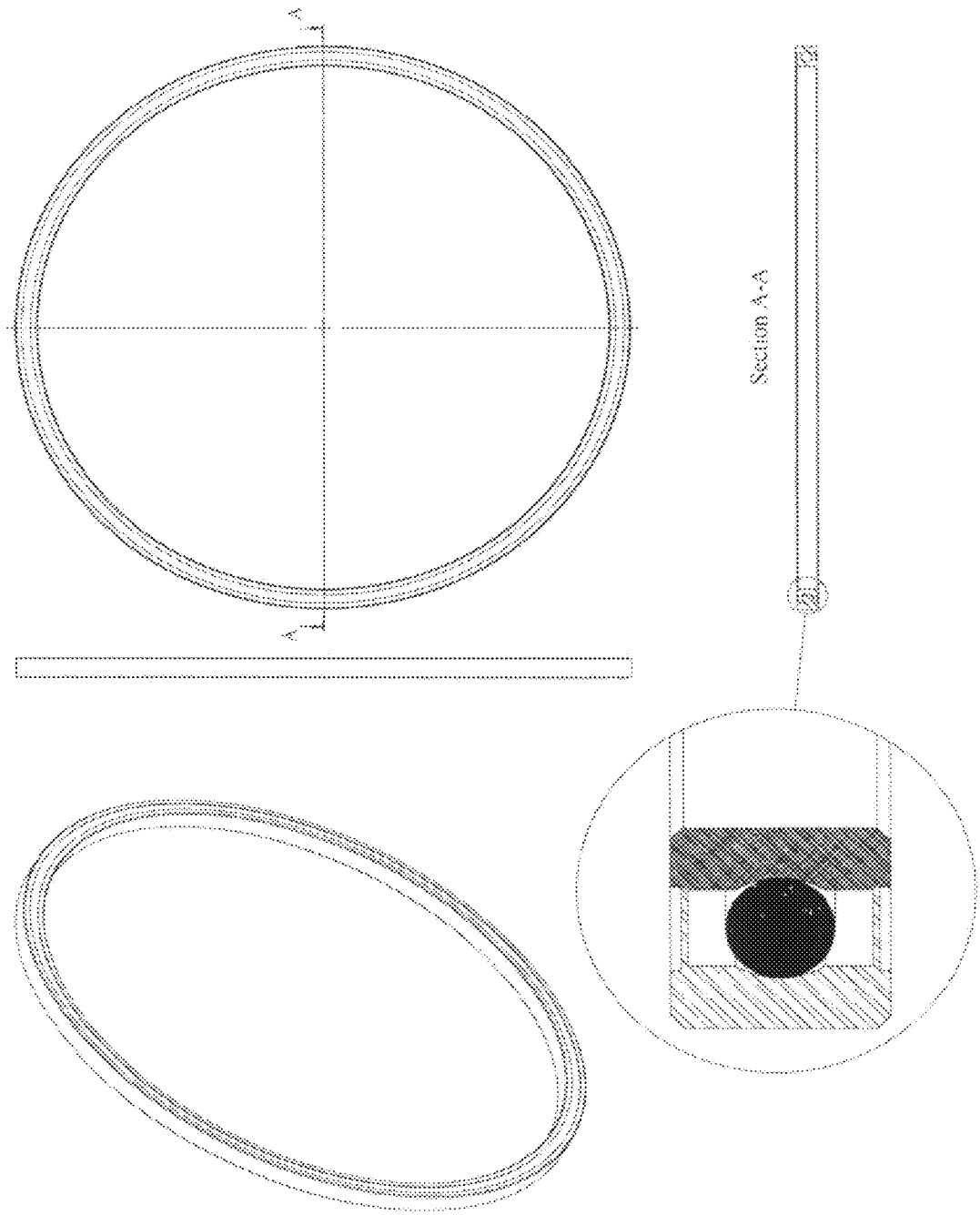

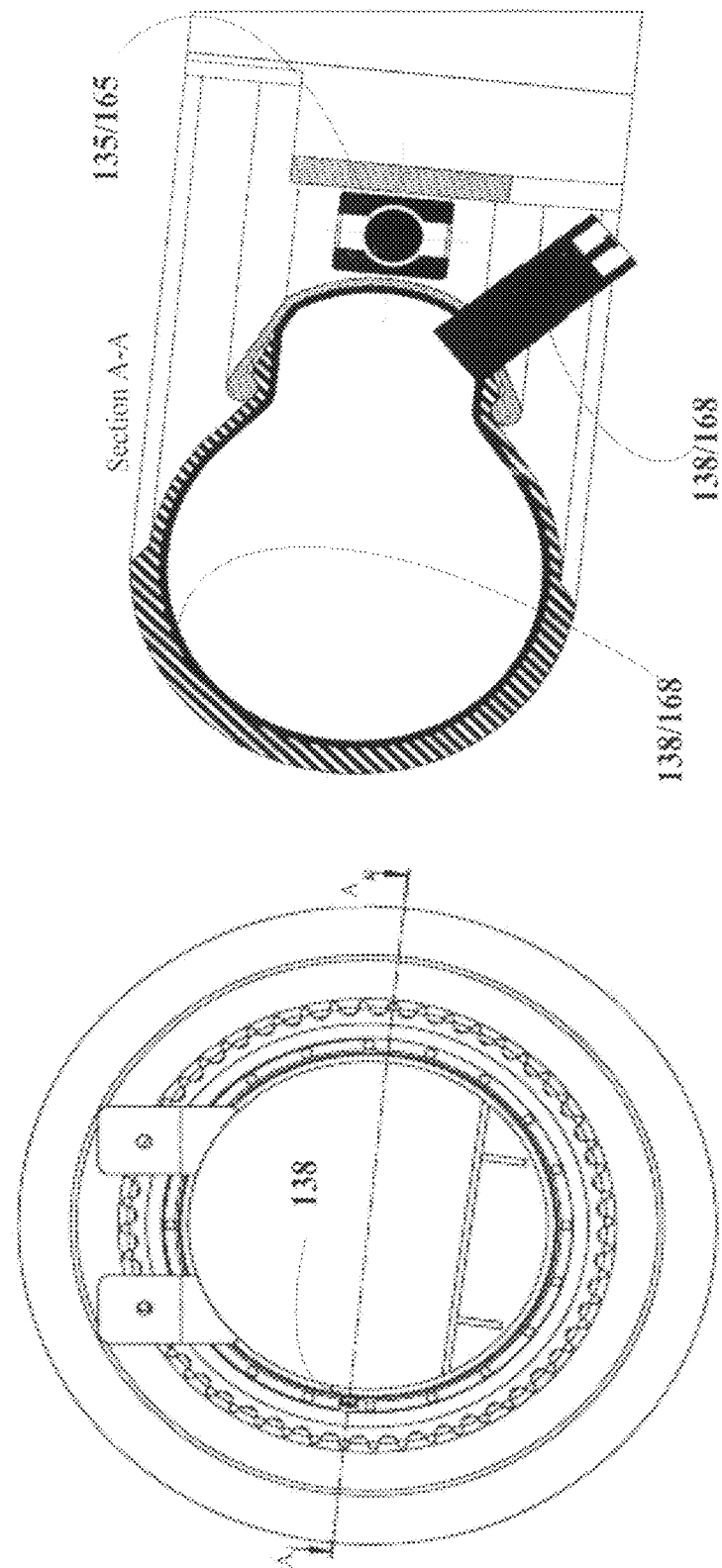

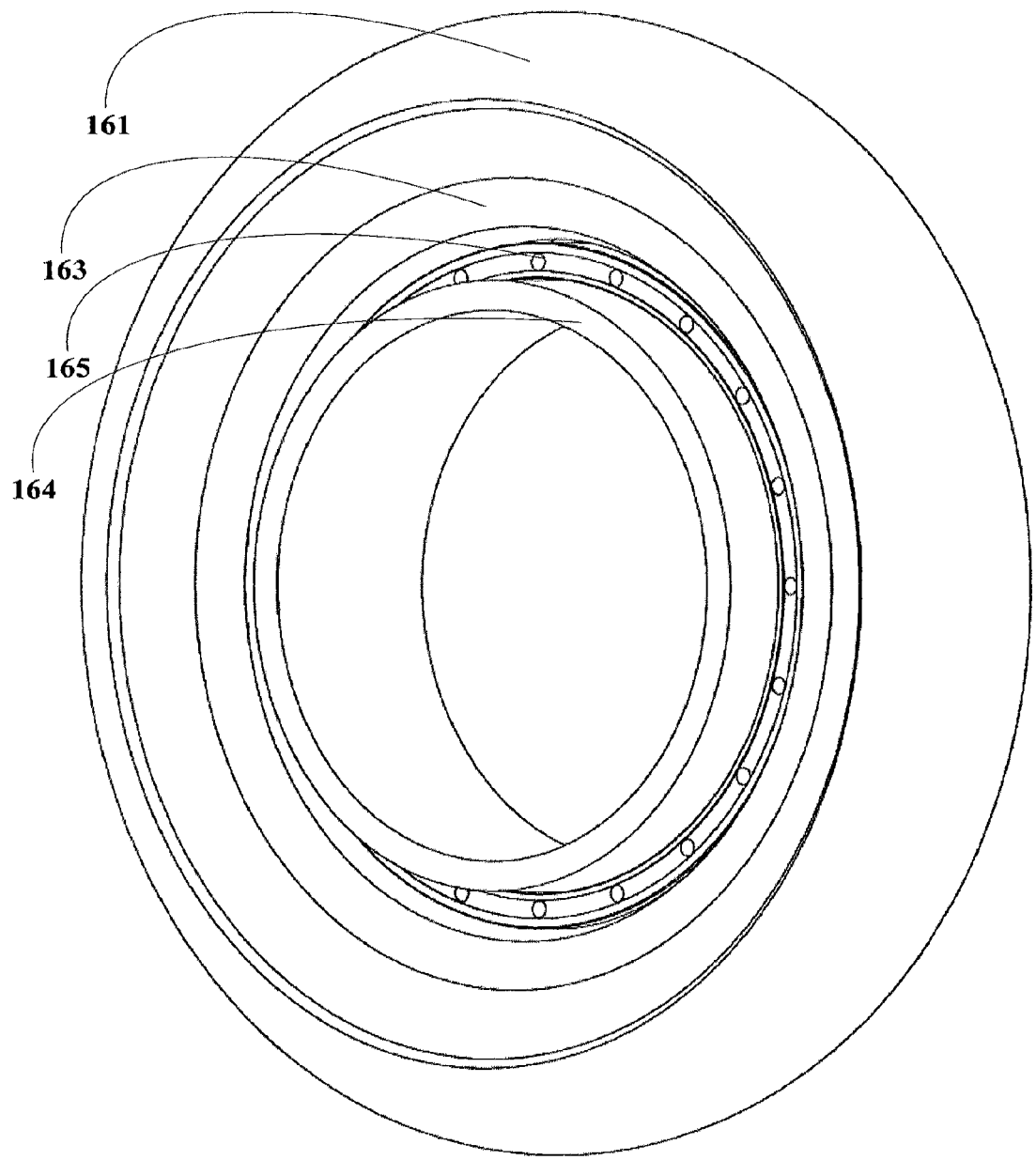
Fig. 10A - Front Hubless Wheel (160)

Fig. 10B - Front Hubless Wheel (160) with portion of Interface Assembly (143), portion of Chassis (110) and Front Footstand (150), showing exemplary configuration of same
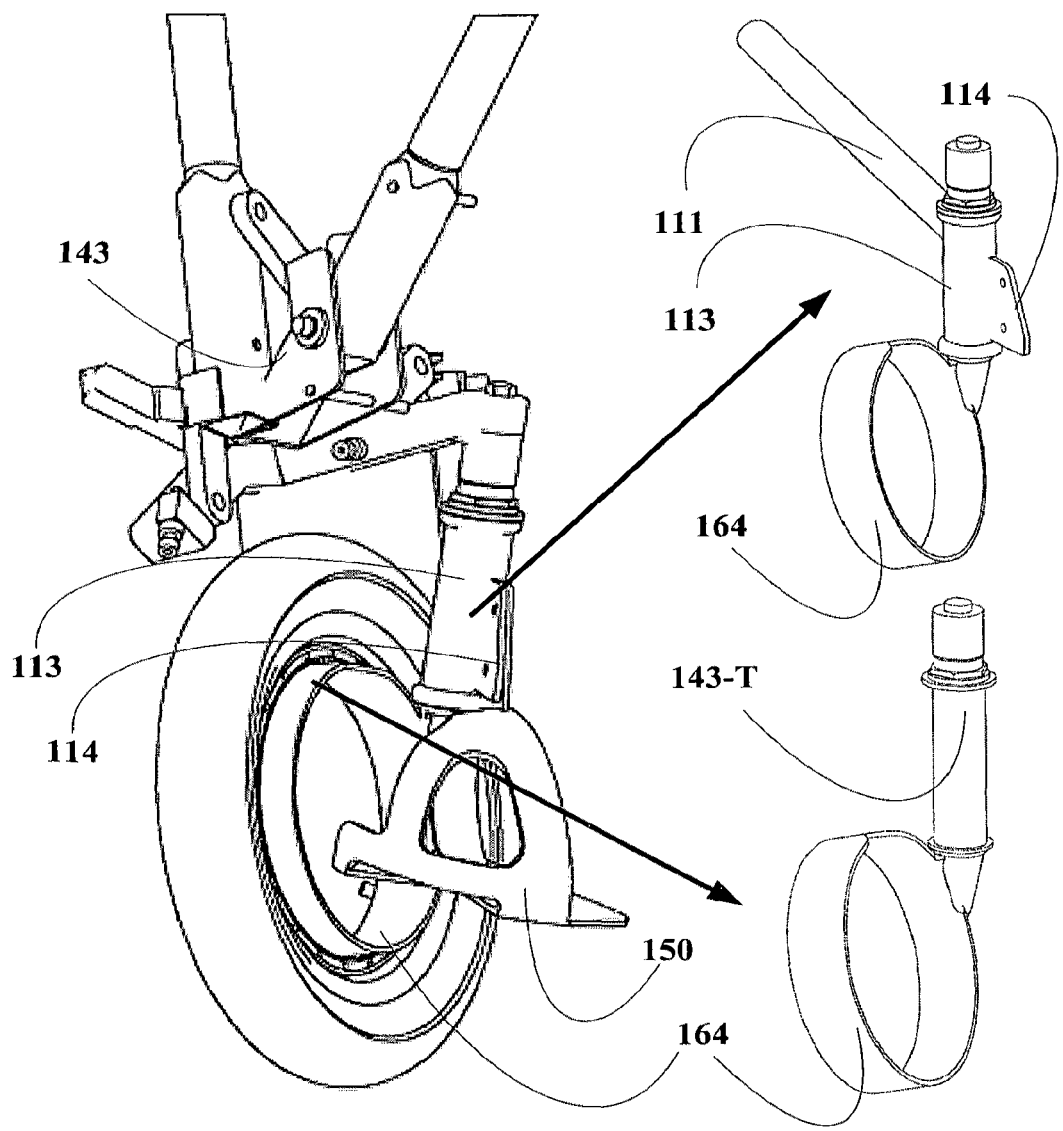

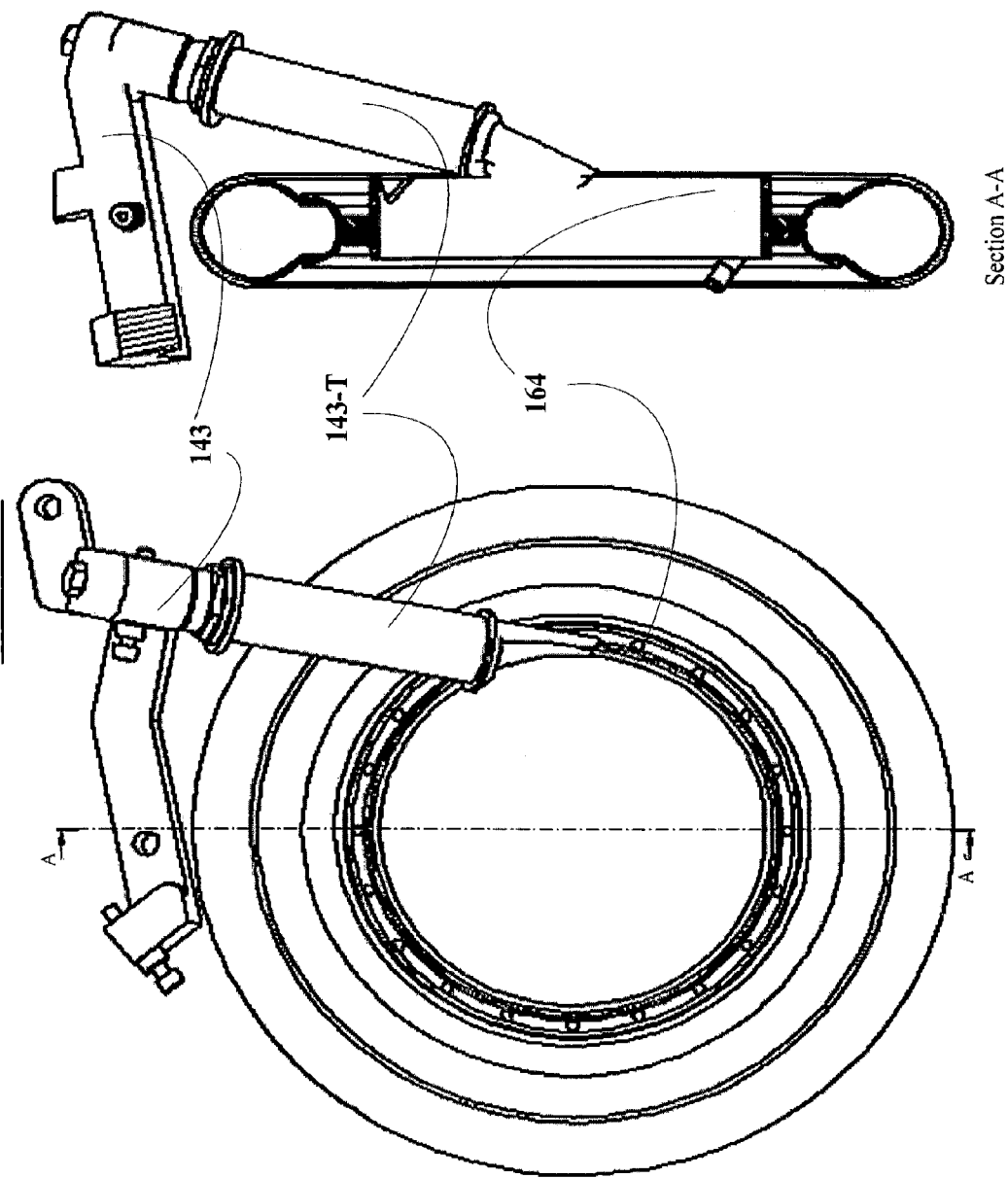
Fig. 10C - Front Hubless Wheel (160) with portion of Interface Assembly (143), showing exemplary connection between them

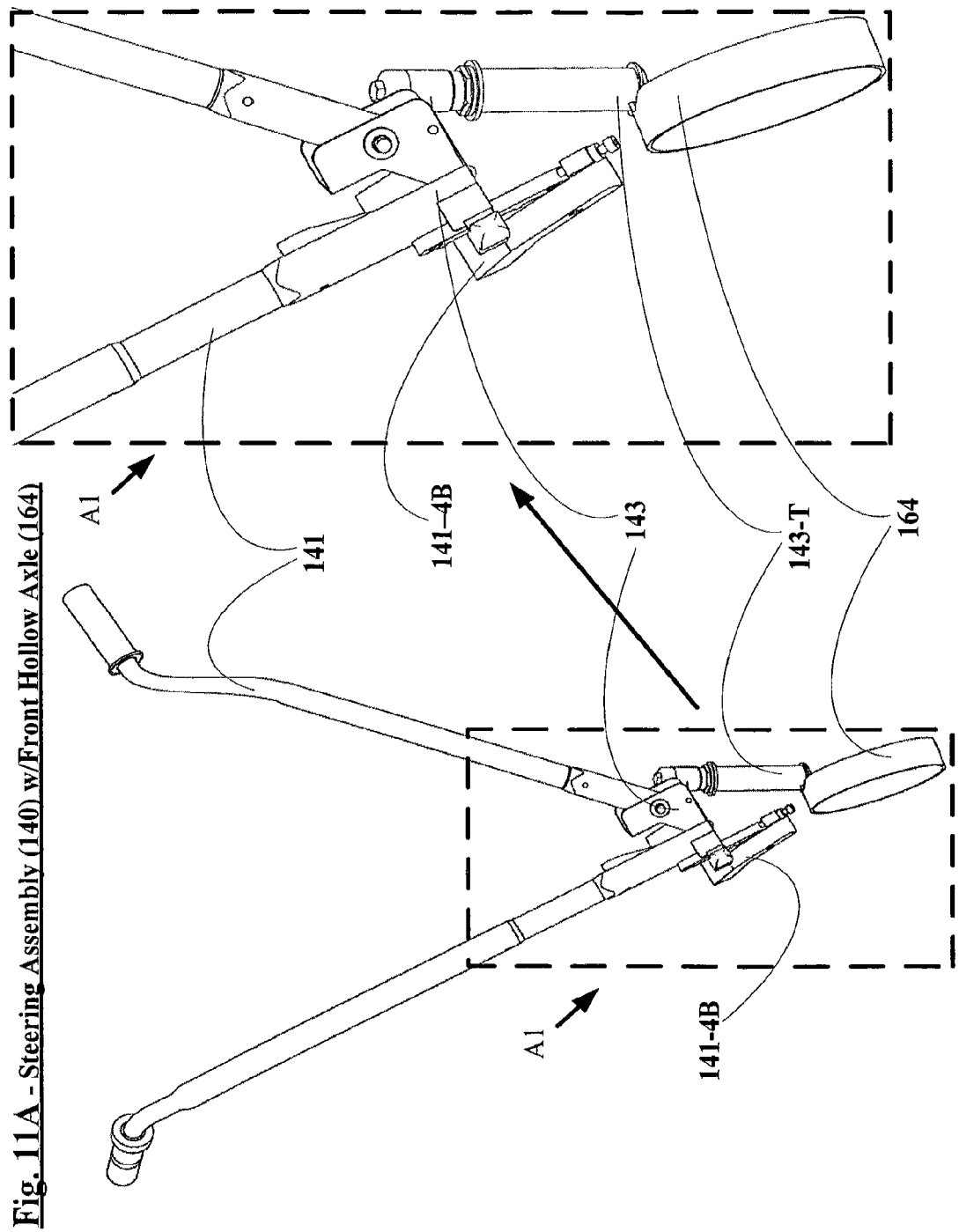
Fig. 11A - Steering Assembly (140) w/Front Hollow Axle (164)

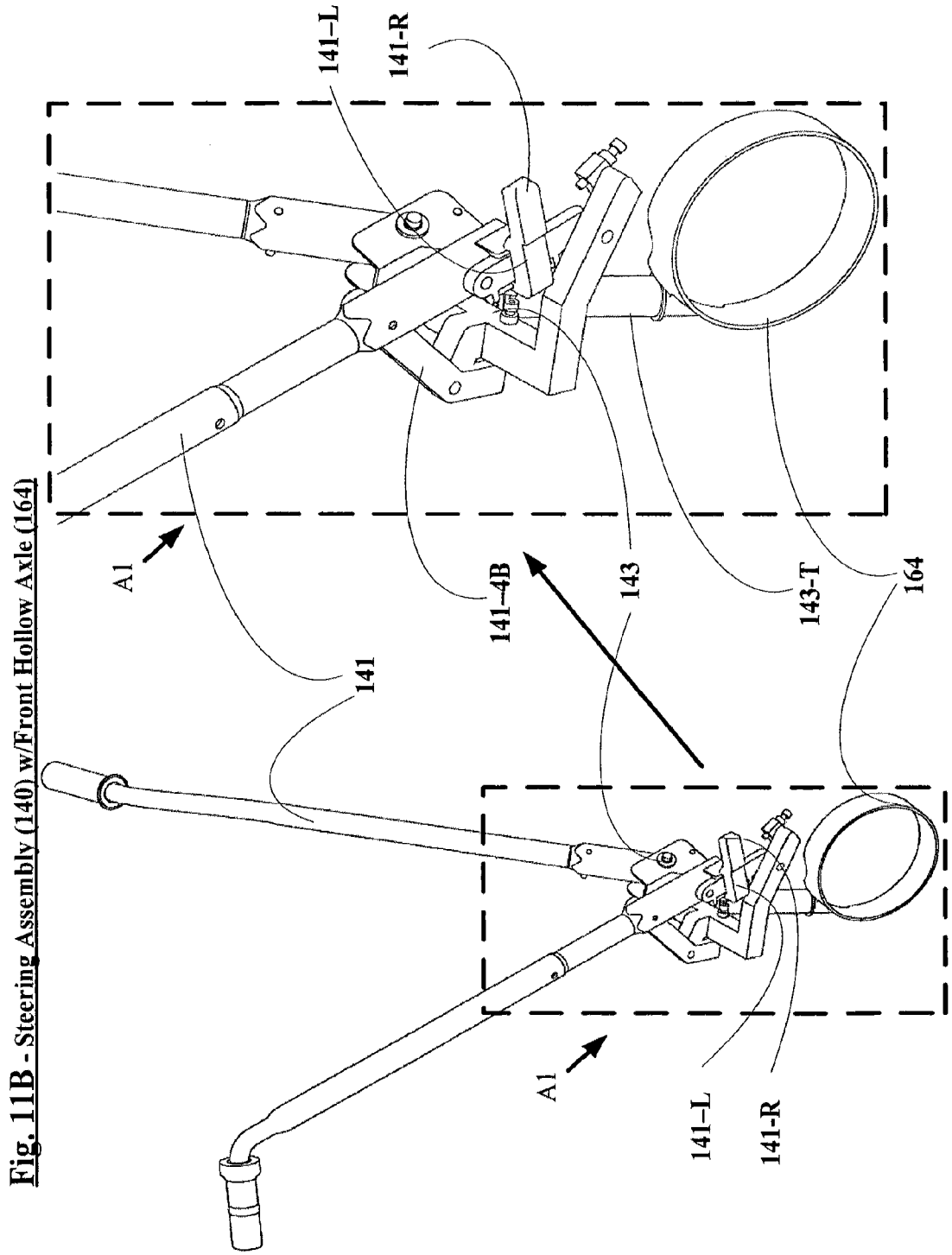
Fig. 11B - Steering Assembly (140) w/Front Hollow Axle (164)

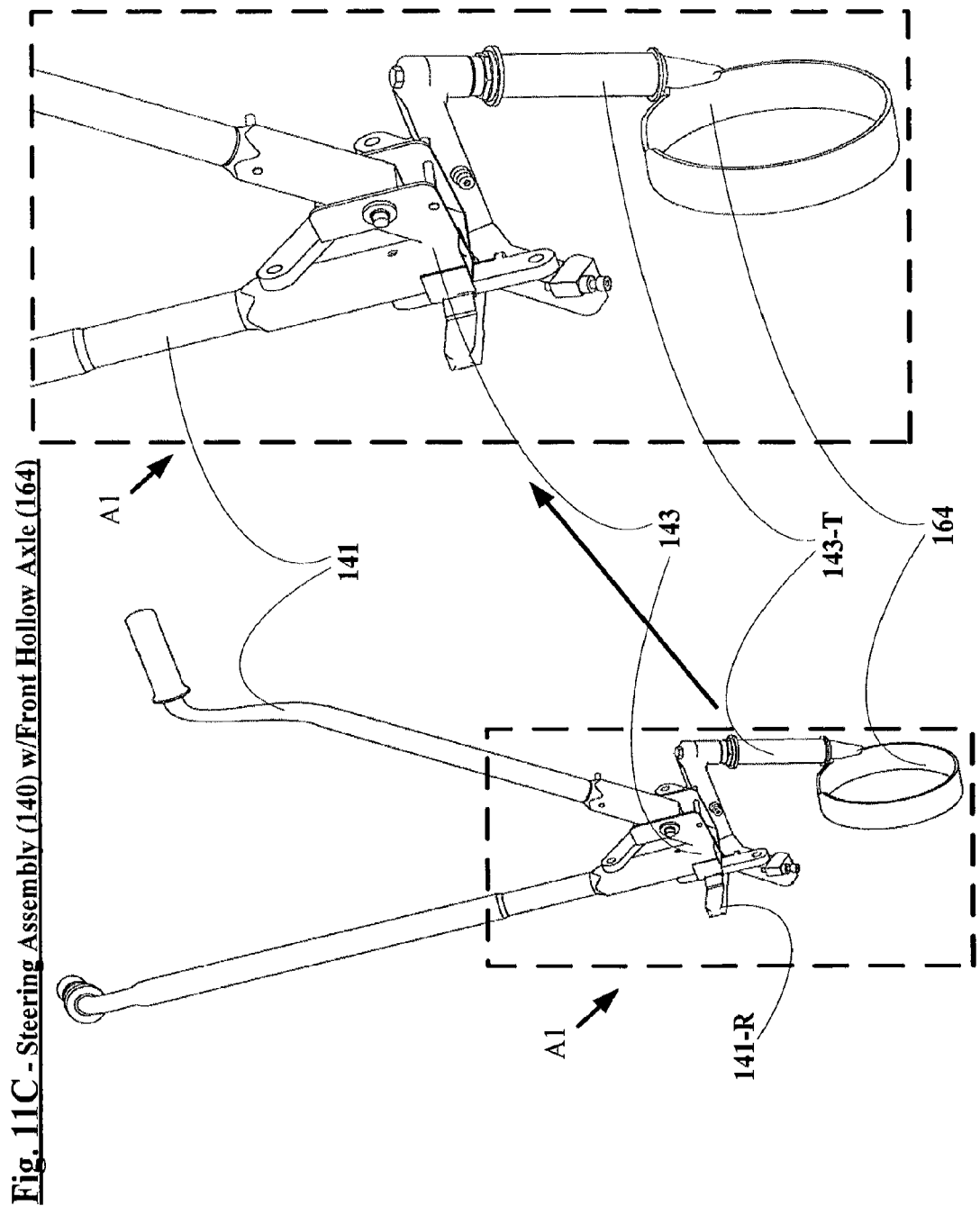

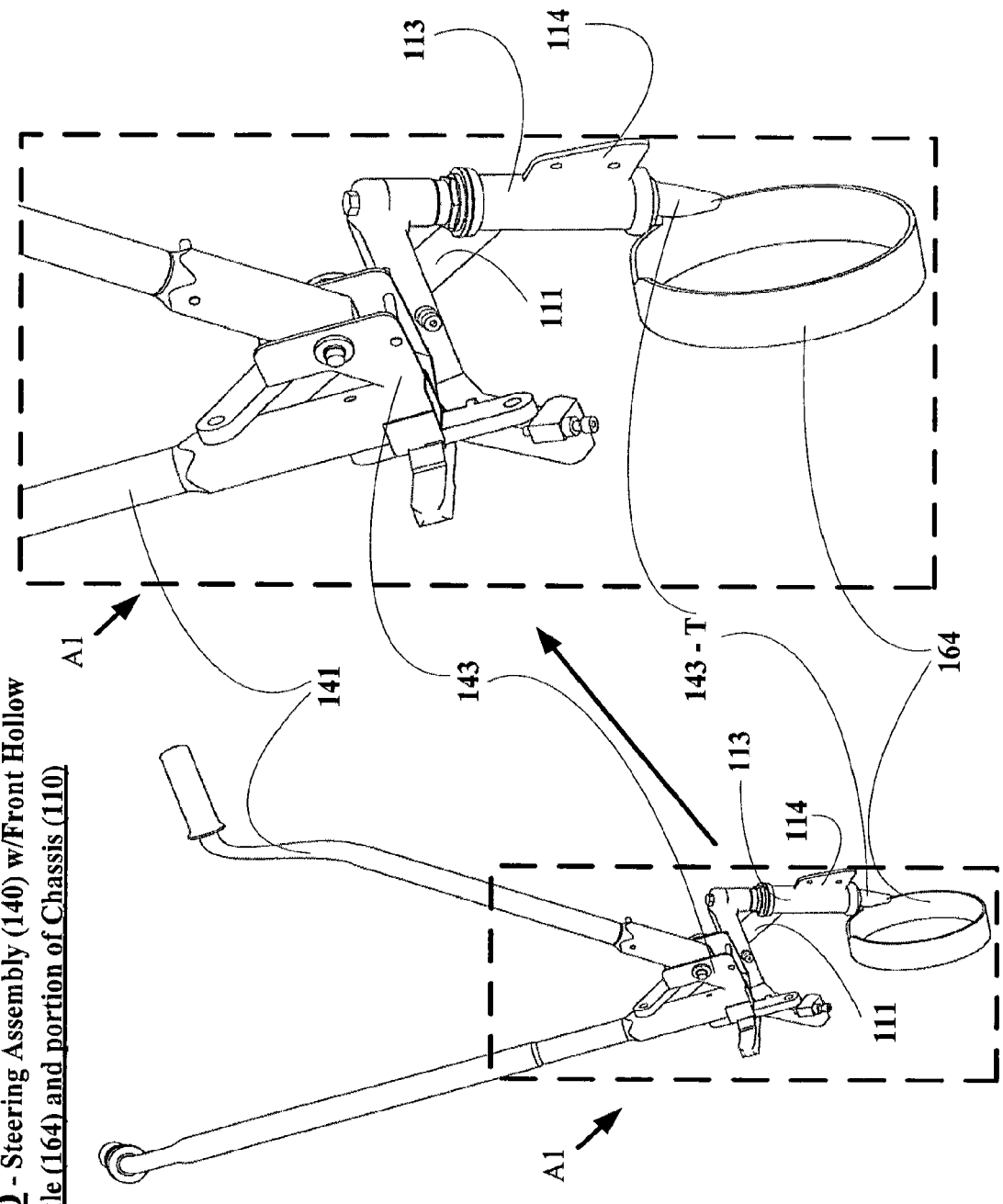
Fig. 11D - Steering Assembly (140) w/Front Hollow Axle (164) and portion of Chassis (110)

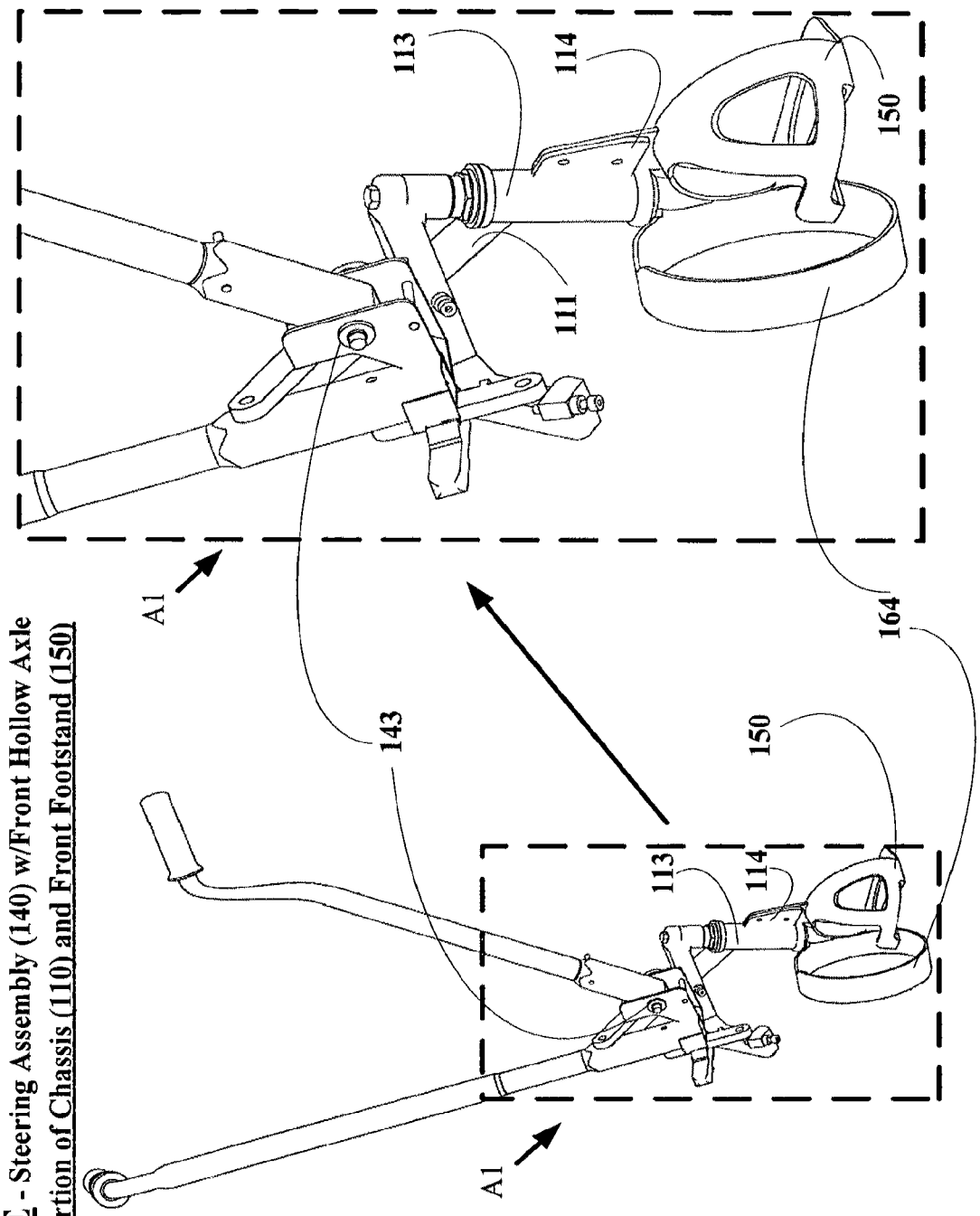
Fig. 11E - Steering Assembly (140) w/Front Hollow Axle (164), portion of Chassis (110) and Front Footstand (150)

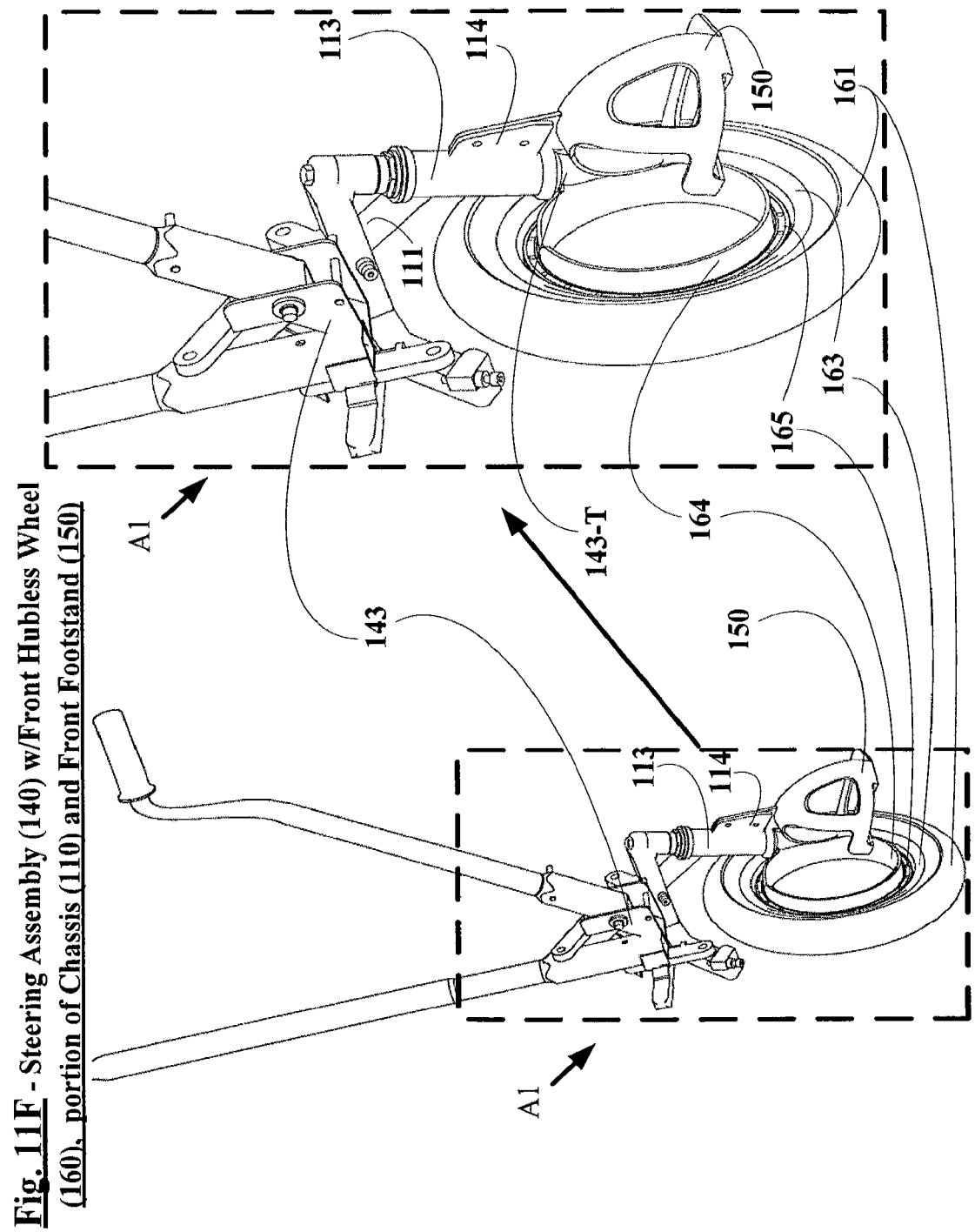
Fig. 11F - Steering Assembly (140) w/Front Hubless Wheel (160), portion of Chassis (110) and Front Footstand (150)

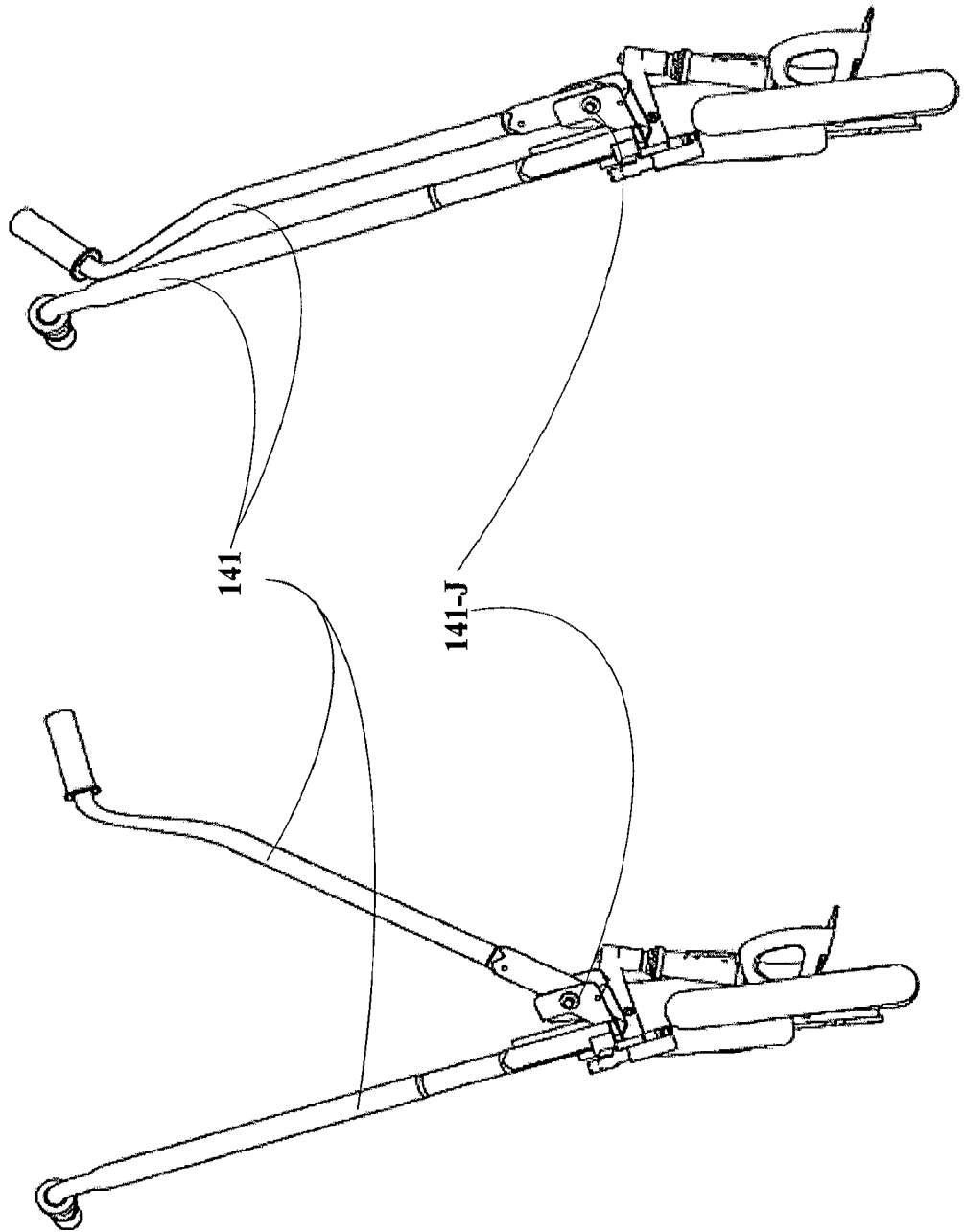
Fig. 12A - HWPV (100) – example of embodiment, wherein Handlebars (141) include Joint (141-J) adapted to facilitate sidewards motion of one handlebar

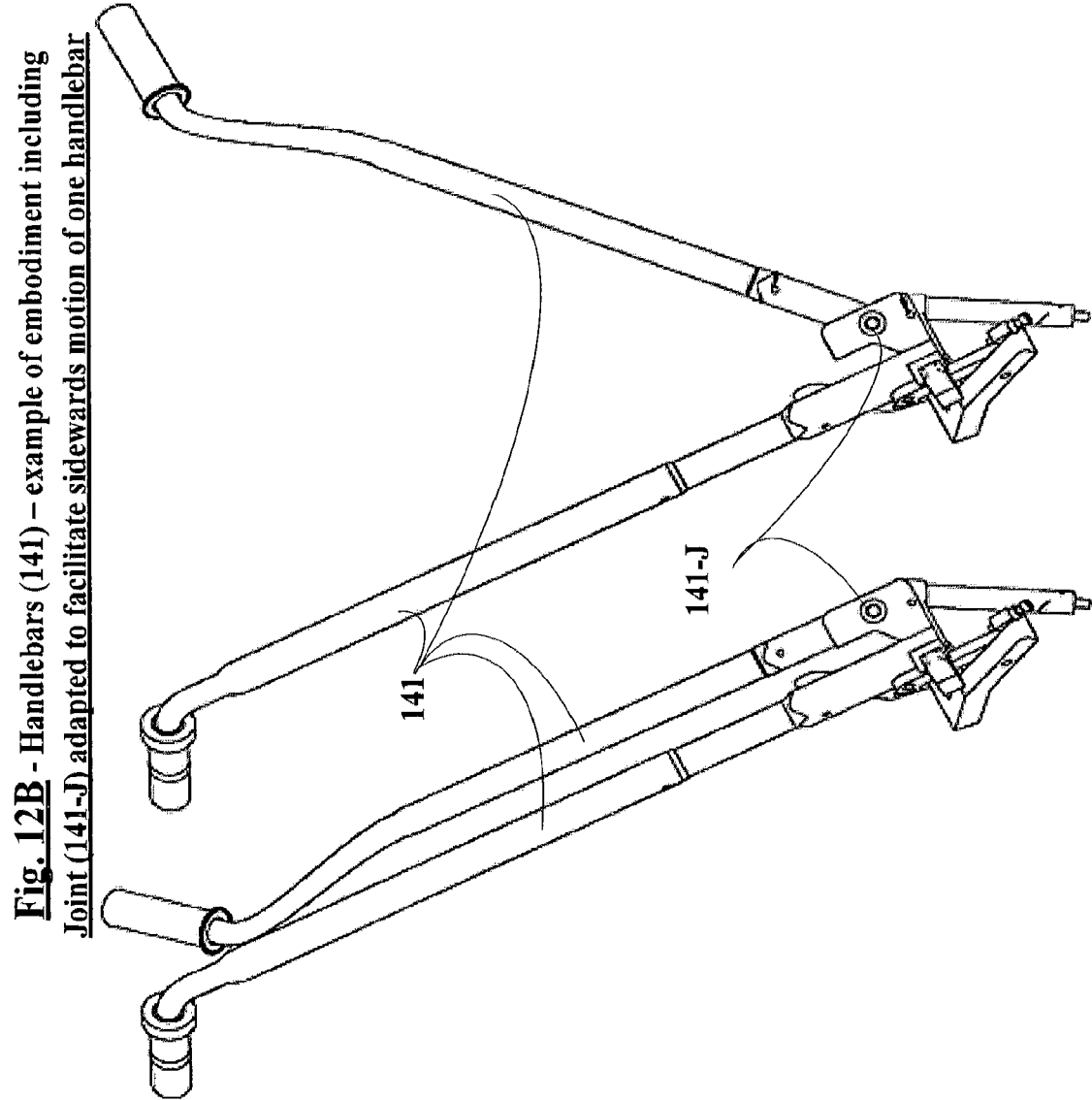
Fig. 12B - Handlebars (141) – example of embodiment including Joint (141-J) adapted to facilitate sidewards motion of one handlebar

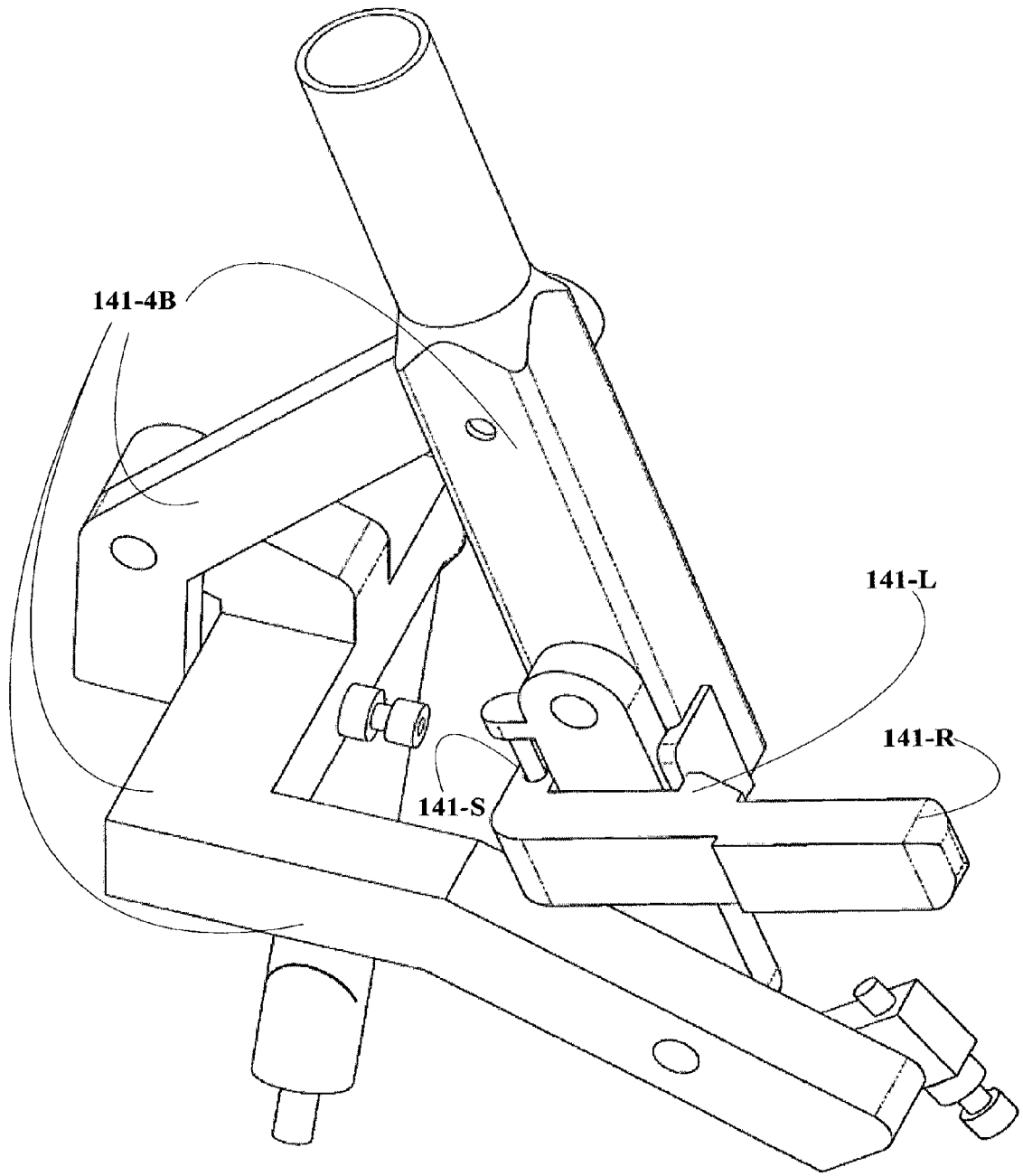
Fig. 13A - Four-Bar Linkage System (141-4B)

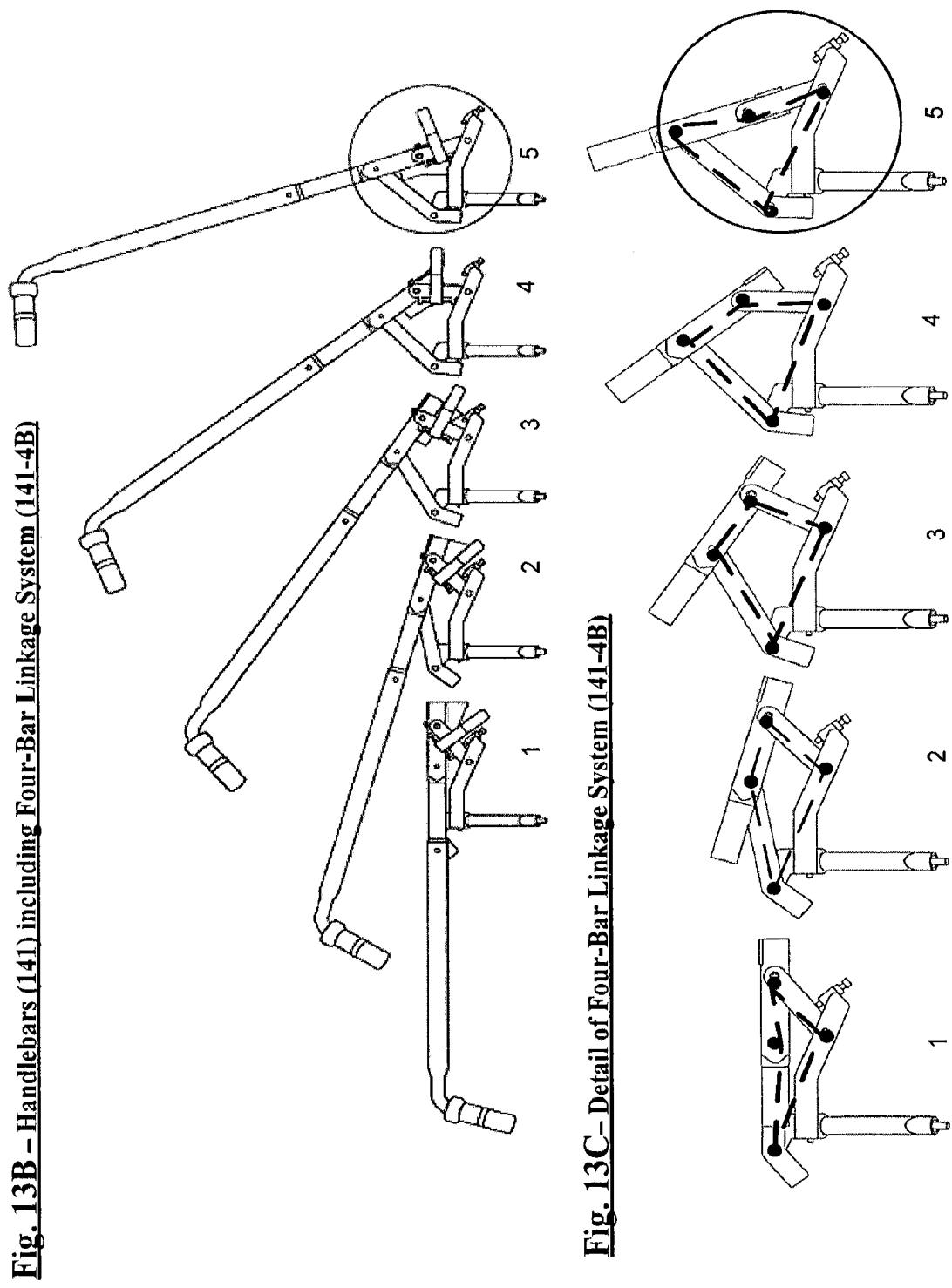
Fig. 13B – Handlebars (141) including Four-Bar Linkage System (141-4B)
Fig. 13C – Detail of Four-Bar Linkage System (141-4B)

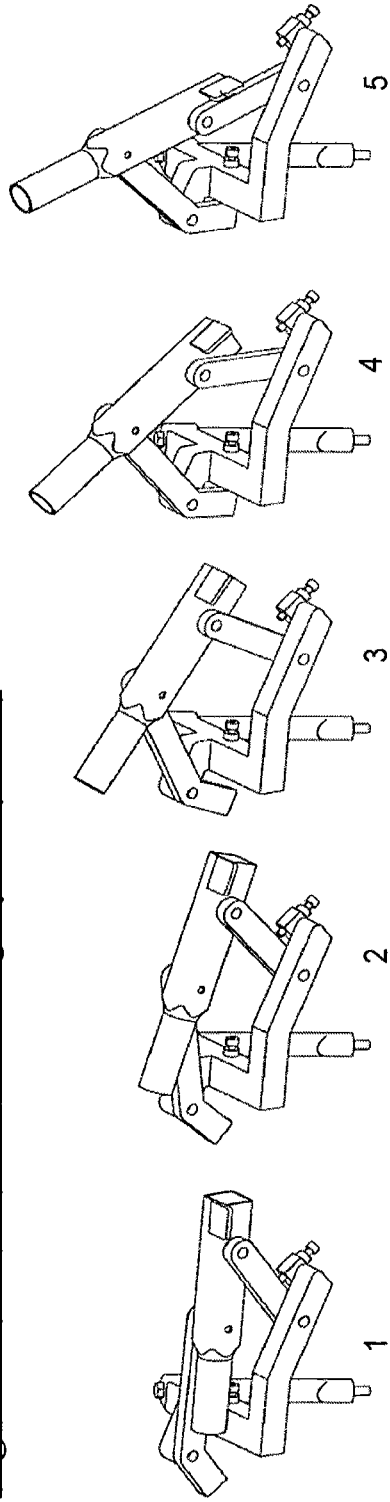
Fig. 13D – Detail of Four-Bar Linkage System (141-4B)
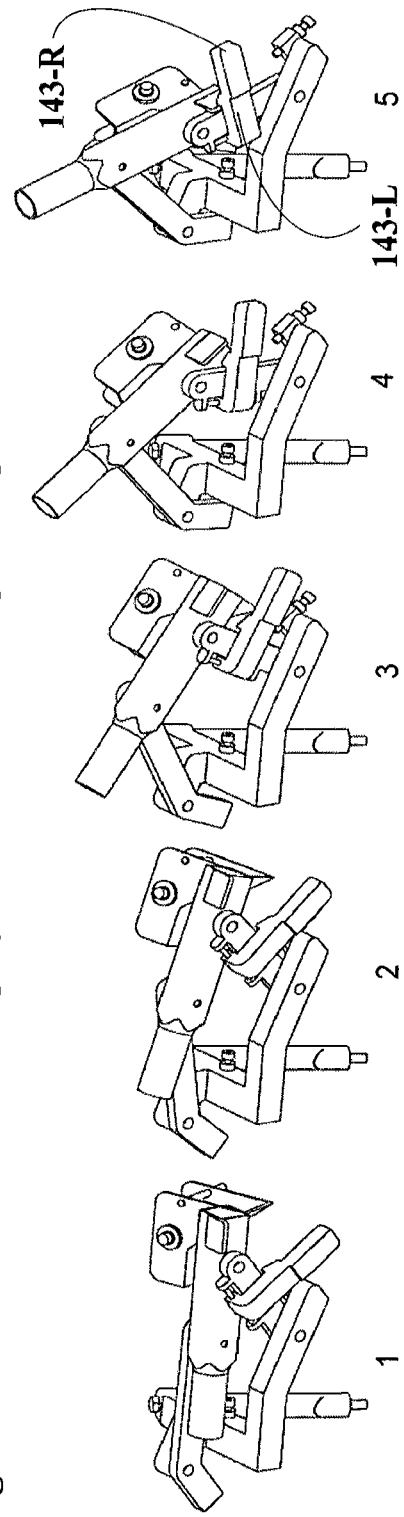
Fig. 13E – Detail of Four-Bar Linkage System (141-4B) including Locking Mechanism (141-L)

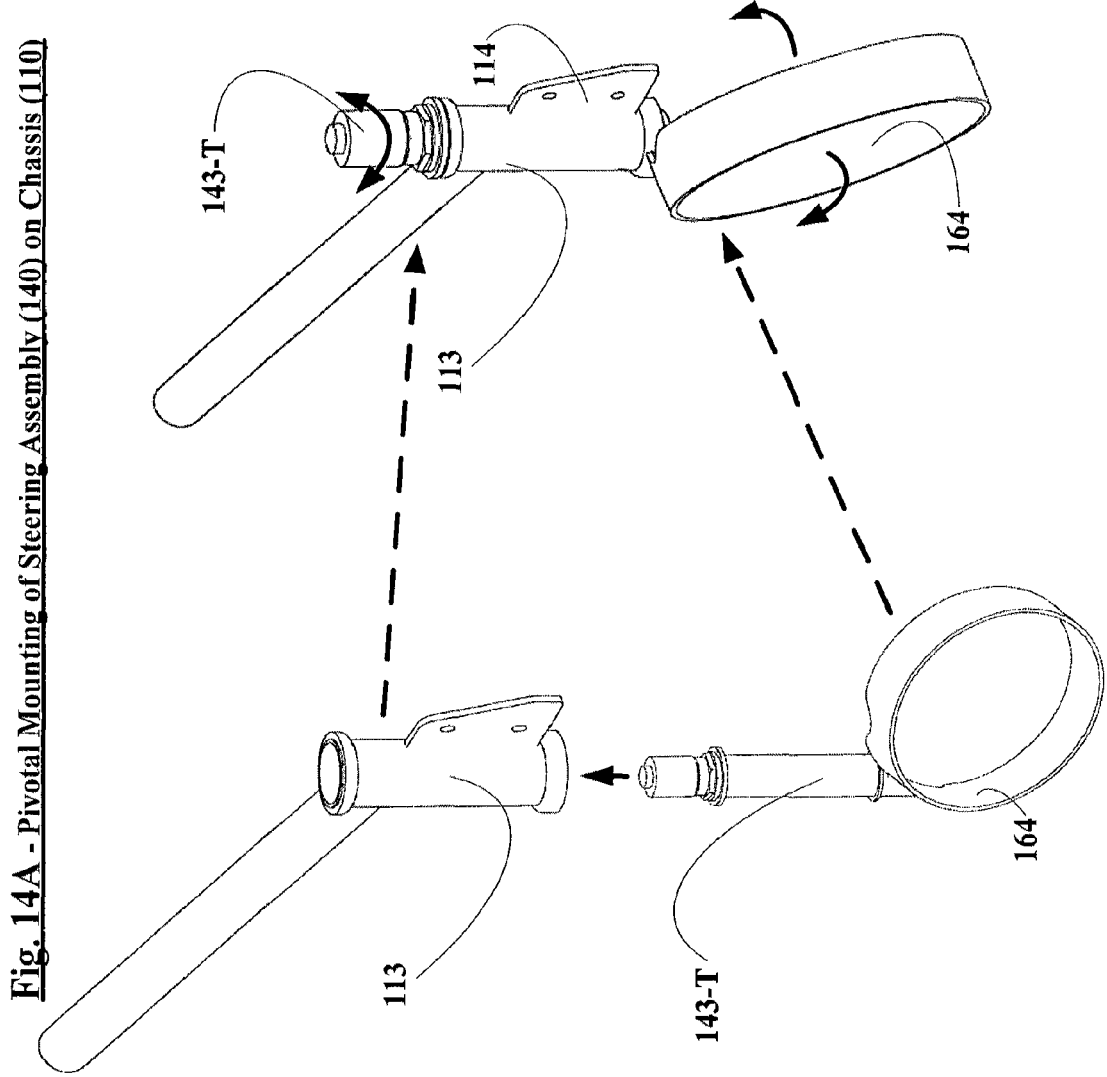
Fig. 14A - Pivotal Mounting of Steering Assembly (140) on Chassis (110)

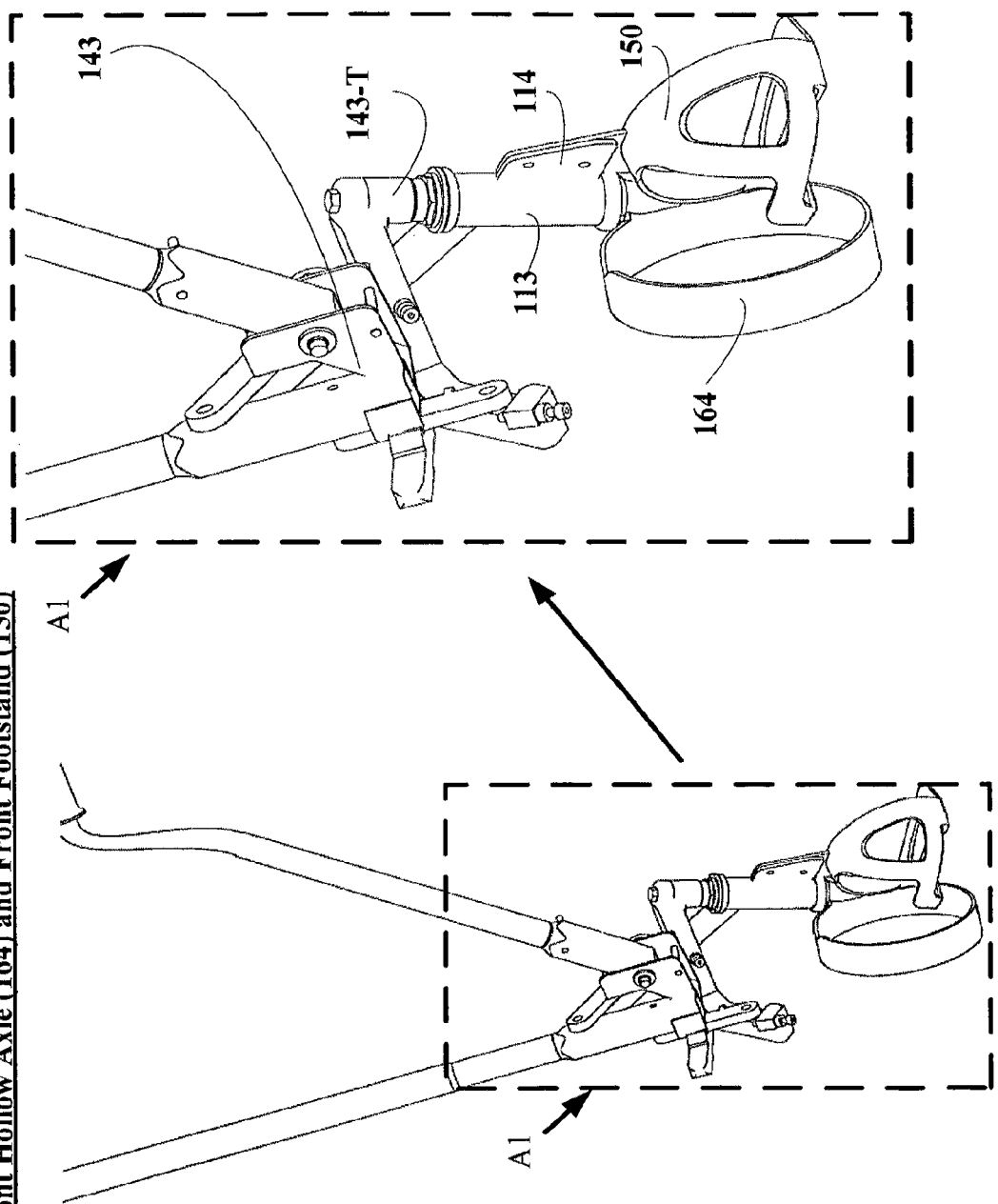
Fig. 14B - Steering Assembly (140) w/portion of Chassis (110), Front Hollow Axle (164) and Front Footstand (150)

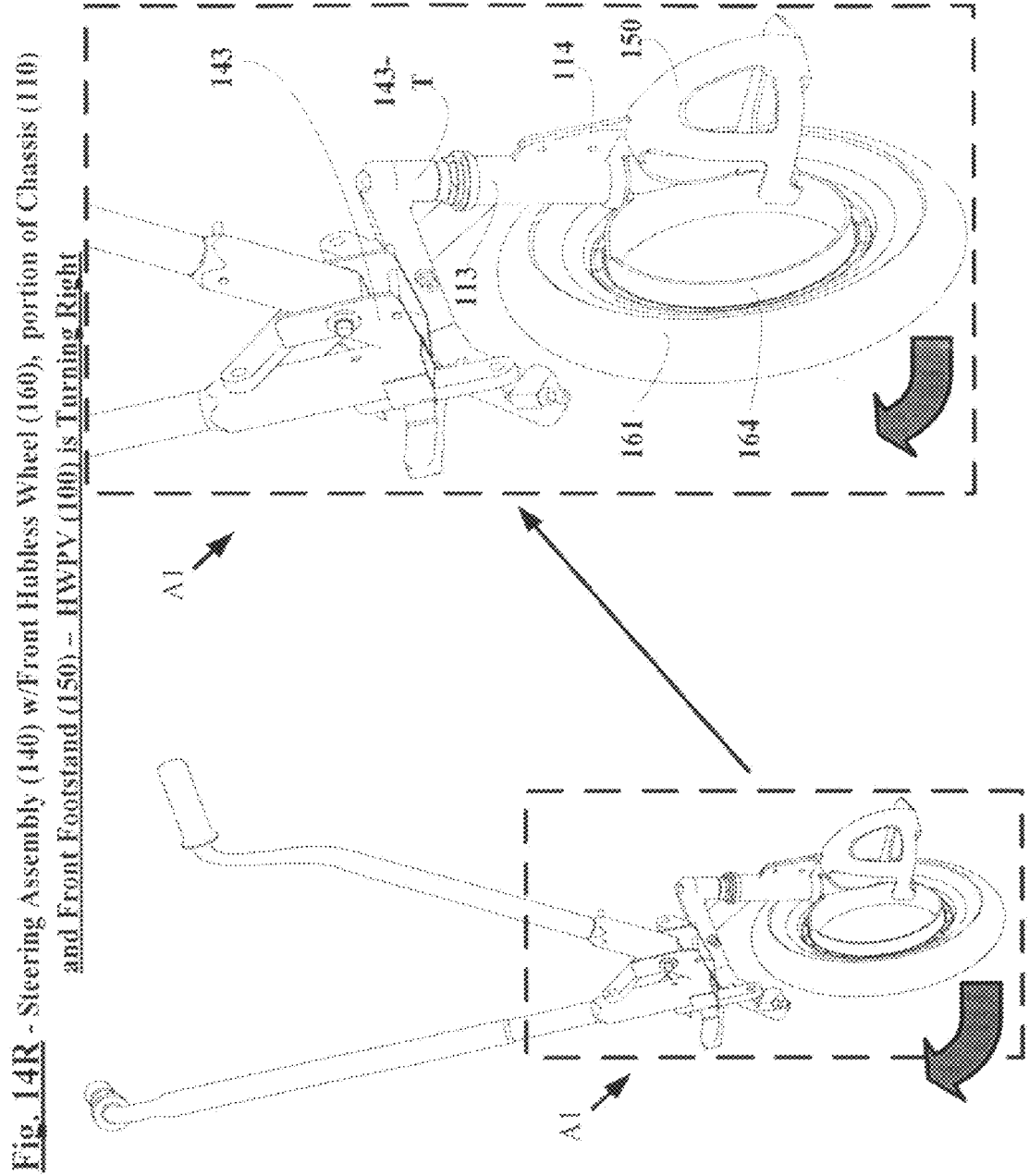

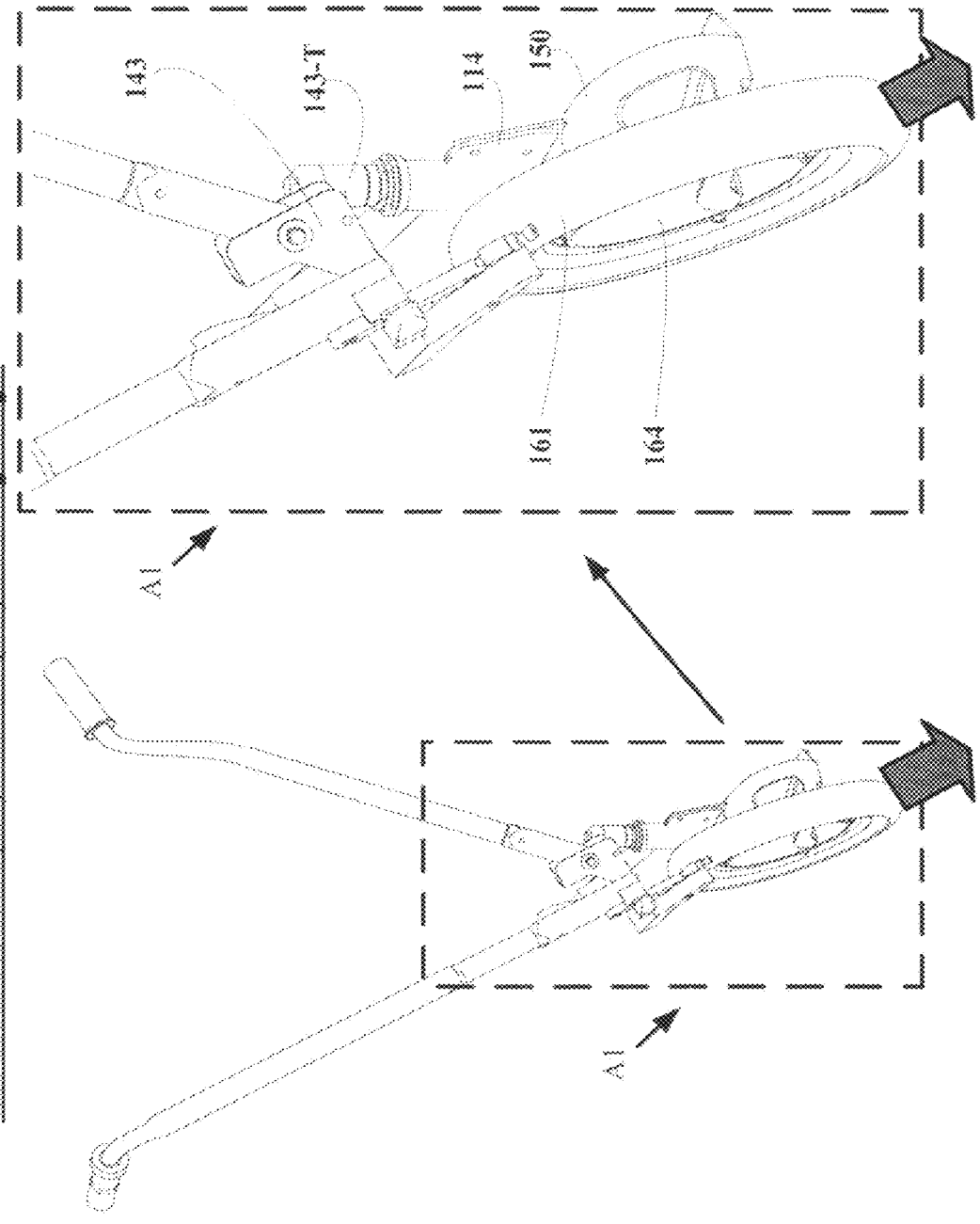
Fig. 14S - Steering Assembly (140) w/Front Hubless Wheel (160), portion of Chassis (110) and Front Footstand (150) – HWPV (100) is Driving Straight

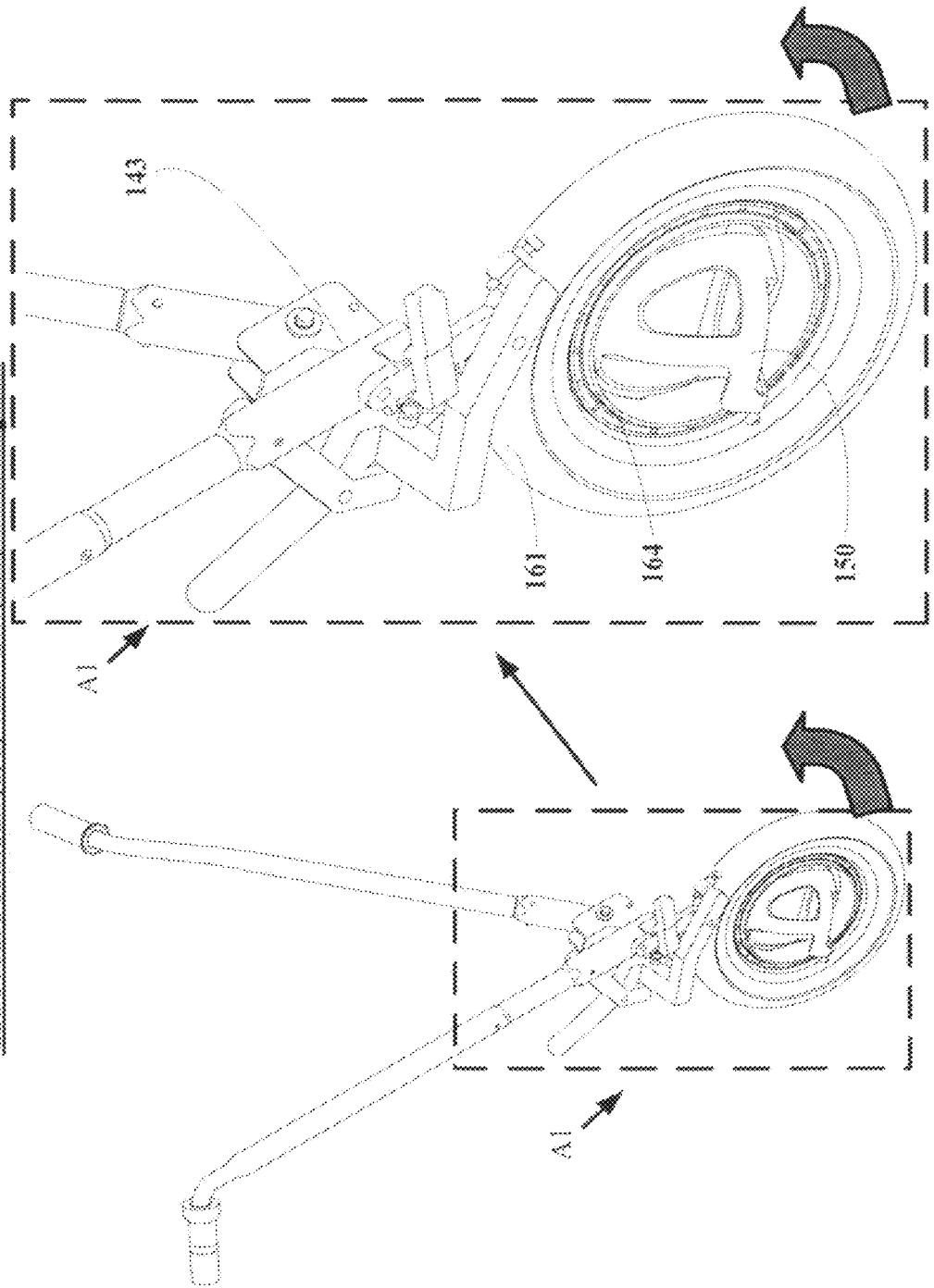
Fig. 14L - Steering Assembly (140) w/Front Hubless Wheel (160), portion of Chassis (110) and Front Footstand (150) – HWPV (100) is Turning Left

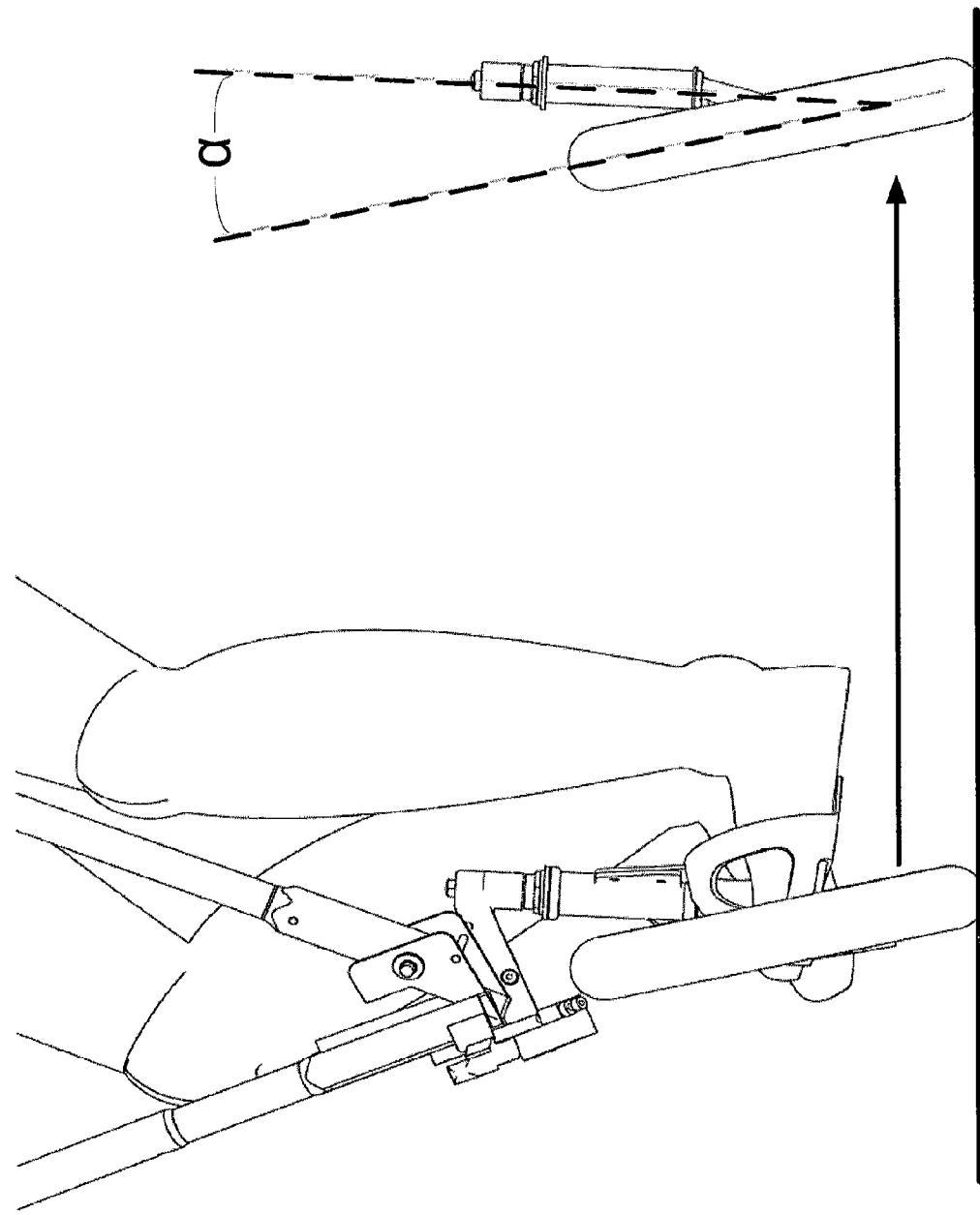
Fig. 18 - HWPV (100) w/Rider driving straight

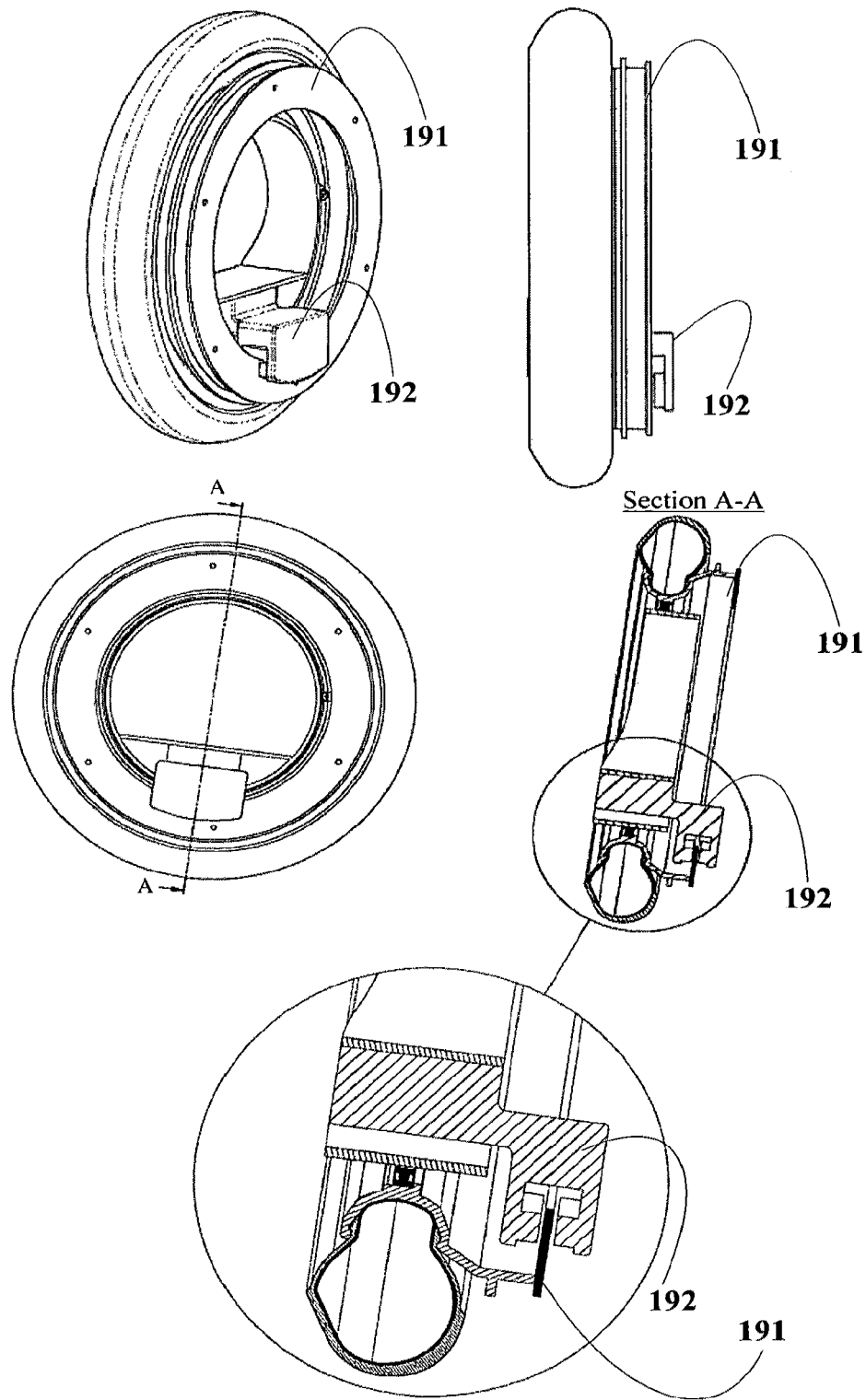
Fig. 19 – Rear Wheel (130) w/Brake (190)

PERSONAL VEHICLE

FIELD OF THE INVENTION

The present invention generally relates to the field of personal vehicles. More specifically, the present invention relates to components, arrangements and assembly of a personal vehicle and methods for producing same.

BACKGROUND

Since the invention of the wheel mankind has been busy trying to avoid walking from place to place. There is evidence of camel pulled wheeled vehicles as far back as 3000-4000 BC. The use of wheeled vehicles has since become so widespread it is hard to picture a human society without wheeled vehicles.

Accordingly, mankind has endlessly endeavored to improve and create new wheeled vehicles and related devices. Particular interest over recent years has been afforded to the field of personal vehicles. As mankind gets lazier and lazier and space for large vehicles becomes more and more scarce, it has become quite common to view people, particularly in urban areas, riding around on personal vehicles, often times motorized personal vehicles. This flurry of activity in the field of personal vehicles has promoted many advances in the field and the development of many new types of vehicles, new variations of existing vehicles and new developments and improvements relating to the components of such vehicles (e.g. brakes, gears, grips, etc).

Nonetheless, despite all the progress mankind has made in the field of wheeled vehicles, the wheel at the base of all these vehicles has stayed remarkably similar to its origin. It is remarkable to see how similar a modern day bicycle wheel is to a Roman Chariot wheel.

One exception to this principle has been the invention of the "Hubless Wheel" in different variations (see Takeo et. Al. U.S. Pat. No. 2,843,426, Lidov, U.S. Pat. No. 4,045,096 & Sbarro U.S. Pat. No. 5,071,196)

A hubless wheel (also known as a rim-rider or centerless wheel) is a type of wheel with no center hub. To be precise, however, the hub does exist, it is simply hollow and almost as big as the wheel itself. The axle is hollow, following the wheel at very close tolerances, leaving an empty space at the center of the wheel.

Hubless wheels, until now, have remained mostly theoretical concepts, seeing very little practical implementation and virtually no implementations realizing the advantage of the wheels—namely the hollow center. One implementation of a personal vehicle including hubless wheels can be found in Karpman et al. U.S. Pat. No. 6,705,630. This implementation, however, provides a sporty type of vehicle, useful for recreation yet greatly lacking as a transportational vehicle, as it requires great skill to maneuver and is difficult to propel over any significant distance.

It would therefore be desirable to provide further personal vehicles utilizing hubless wheels, and particularly their advantages, and perhaps to provide a self propelled vehicle of this sort.

SUMMARY OF THE INVENTION

The present invention relates to components, arrangements and assembly of a personal vehicle and methods for producing same. According to some embodiments of the present invention, there may be provided a personal vehicle including one or more "hubless wheels" (hereinafter referred to as: a "HWPV"="Hubless Wheeled Personal Vehicle"). "Hubless Wheel"* may be defined as: a wheel with a hollow axle, i.e. a wheel having an empty space at its center. * It should be noted that a "hubless" wheel may actually have a hub. The hub of a hubless wheel may simply be larger than the hub of an ordinary wheel, often nearly as large as the outer rim of the wheel, leaving space for a hollow axle, such that a round empty space may be attained at the center of the wheel where the hub and axle of an ordinary wheel reside. Hence, the somewhat misleading name—"hubless wheel"). According to further embodiments of the present invention, a HWPV may further include one or more footstands, which footstands may be mounted such that they reside within the center of a hubless wheel, such that a rider of the HWPV standing on the footstands is essentially standing with his/her feet within the wheels of the HWPV. Accordingly, the wheels may rotate around one or more of the footstands and one or more of the feet of a rider of the HWPV to facilitate forward/backward movement of the HWPV.

Furthermore, when a rider of the HWPV is standing on the footstands, a combined rider/vehicle center of gravity which is directly above the line connecting the contact points between the wheels and the road (which is necessary in order to maintain lateral balance), may be achieved by tilting the HWPV to the side opposing the rider (creating a "V" between the rider and the vehicle). Accordingly, the HWPV may be tilted to the side when a rider of the vehicle is standing on the footstands and driving forward. As a result, when the HWPV is being ridden by a rider standing on the footstands, the common diametral plane of the wheels may not be perpendicular to the road (i.e. the axis of rotation of the wheels may be at an angle (not parallel) to the road). Components of the HWPV, such as the tires, steering assembly or bearings, may be configured to account for the angled position of the vehicle while moving. For example, thin section bearings suitable to support the angled forces applied to the bearings of a vehicle tilted sideways may be used, asymmetric tires suitable to be ridden at an angle may be used, and so on.

According to some embodiments of the present invention, a steering assembly may be attached the front wheel/axle of a HWPV or to the front footstand, which steering assembly may include handlebars or any other steering mechanism adapted to facilitate the turning of the front wheel of the HWPV. Accordingly, the front wheel may rotate/spin around the front footstand in the longitudinal direction (when the HWPV is moving forward or backwards) and may further rotate around the front footstand on the lateral plane (when the HWPV is turning). According to further embodiments of the present invention, the steering assembly may be asymmetric and further, in contrast to standard personal vehicles, may meet the front wheel at an angle, such that the steering axis may be at a sideways angle to the diametral plane of the front wheel, i.e. the steering axis may not reside within the diametral plane of the front wheel, yet at the same time may not reside within a plane parallel to the diametral plane of the front wheel, such that it intersects the diametral plane of the front wheel at a sideward angle. According to further embodiments of the present invention, the steering mechanism may be adapted to fold to allow for easier storage and transport of the HWPV.

According to yet further embodiments of the present invention, an engine may be mounted on a HWPV (e.g. an electric motor, an internal combustion engine, etc.), which engine may be adapted to propel the HWPV, i.e. a HWPV may be motorized.

According to some embodiments of the present invention there may be provided a HWPV comprised of:

a. A Chassis, which may be fabricated from any rigid material, such as a steel alloy, hard plastic, fiberglass, carbon fiber, aluminum, any other material having the necessary strength and/or any combination thereof, and may be comprised of:
   i. A horizontal element;
   ii. Rear mounts for a footstand and/or a wheel, which Rear mounts may be attached to one end (rear) of the horizontal element;
   iii. A front mount for a pivotal connection to a steering assembly, which Front mount may be attached to the other end (front) of the horizontal element;
   iv. A Front Mount for a Footstand, which Front mount may also be attached to the front end of the horizontal element;
   v. An engine mount, which Engine mount may be attached to the horizontal element in a position to facilitate the engine's operation;
   vi. A mount for a power/fuel supply, which fuel supply mount may be attached to the horizontal element in a position to facilitate the engine's operation; and
   vii. A handle for lifting/carrying the HWPV.
b. A Rear Footstand, which may be attached to the rear portion of the Chassis and may include a circular circumference which may be adapted to serve as an axle for a hubless wheel. Alternatively, the Rear Footstand may be mounted within a Rear Wheel, which is in turn connected to the rear portion of the Chassis;
c. A Rear Hubless Wheel, which may be comprised of;
   i. A Tire or similar element;
   ii. An Inner Tube, which may include a valve stem located on the side of the inner tube to avoid obstructing the center of the hubless wheel.
   iii. An Outer Rim on which the tire may be mounted;
   iv. A Hollow Axle, which may be larger than the axle of a standard wheel and hollow, giving the wheel its "hubless" nature, and on which Hollow Axle the Outer Rim may be mounted such that the Outer Rim, and with it the Tire, are free to rotate around the Axle, such as by the use of bearings or another rolling element. The Rear Hollow Axle may be connected to the Rear Footstand (mounted on the footstand) or directly to the Chassis. Optionally, the circular circumference of the Rear footstand may serve as the Rear Hollow Axle; and
   v. A Sprocket or similar component, which may be rigidly connected to the Outer Rim from one side, such that a rotation of the sprocket will cause a rotation of the Outer Rim and with it the Wheel. Accordingly the Sprocket may be adapted to cause the rotation of the Rear Wheel when force is applied from an engine, via a chain, belt or similar component.
   According to some embodiments of the present invention, the Outer Rim may be separated from the Hollow Axle by thin section bearings or another rolling element adapted to carry and withstand lateral forces exerted on the rolling element as a result of a tilt of the wheel to one side.
d. A Steering Assembly, which may be pivotally attached to the front portion of the Chassis and may comprise:
   i. Handlebars or any other steering control element, adapted to facilitate steering of the HWPV by a rider. The Handlebars or other steering mechanism may include folding elements. According to further embodiments of the present invention, the folding elements within the Handlebars or other steering mechanism may be adapted to "lock" in an open and/or closed state, i.e. may further include locking elements designed to prevent/allow the folding operation of their folding elements. These locking elements may be user actuated and/or automatic (e.g. spring activated);
   ii. A Mount for a front wheel or a Front Footstand; and
   iii. An Interface Assembly between the steering control element, the wheel mount and the pivotal connection to the Chassis, which Interface Assembly may transfer forces applied to the steering control element into rotational forces applied to the front wheel around the steering axis. The Interface Assembly may be designed such that the steering mechanism pivots freely to the sides in relation to the Chassis, while transferring pivotal motion to the front wheel, causing the HWPV to turn if it is in forward motion. According to further embodiments of the present invention, the Interface Assembly may be asymmetric, such that pivotal motion transferred to the front wheel is transferred at an angle to the wheels diameter, i.e. the steering axis may be at an angle to the diametral plane of the front wheel;
e. A Front Footstand, which may be mounted on the front bottom portion of the Chassis. Alternatively, the Front Footstand may be mounted directly to the Steering Assembly and within a Front Wheel, and may include a circular circumference which may be adapted to serve as an axle for a hubless wheel;
f. A Front Hubless Wheel, which may be comprised of;
   i. A Tire or similar element;
   ii. An Inner Tube, which may include a valve stem located on the side of the inner tube to avoid obstructing the center of the hubless wheel.
   iii. An Outer Rim on which the tire may be mounted;
   iv. A Hollow Axle, which may be larger than the axle of a standard wheel and hollow, giving the wheel its "hubless" nature, and on which Hollow Axle the Outer Rim may be mounted such that the Outer Rim, and with it the Tire, are free to rotate around the Axle, such as by the use of bearings or another rolling element. The Front Hollow Axle may be connected directly to the Steering Assembly, transferring the pivotal motion of the steering assembly to the Front Wheel, such that the Front Wheel turns around the Front Footstand. Optionally, the circular circumference of the Front Footstand may serve as the Front Hollow Axle and accordingly, the Front Footstand may connect the wheel to the Steering Assembly.
   According to some embodiments of the present invention, the Outer Rim may be separated from the Hollow Axle by thin section bearings or another rolling element adapted to carry and withstand lateral forces exerted on the rolling element as a result of a tilt of the wheel to one side.
g. A Propulsion System, which may be mounted on the Chassis and/or the Rear Wheel or Footstand, and may be adapted to propel the HWPV forward and/or backward by any method known today or to be devised in the future. For example, the Propulsion System may include an electric motor which may rotate the Rear Wheel by use of a chain or belt connected to the sprocket, and thus propels the HWPV.
h. An Acceleration Control Element, such as a throttle;
i. A Brake, which may consist of any known braking mechanism or any braking mechanism to be devised in the future; and j. A Brake Control Element, such as a brake handle or pedal.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 1A-1E: are illustrations of an exemplary HWPV [100], from different angles, wherein FIG. 1A includes a model of a rider for demonstrative purposes, all in accordance with some embodiments of the present invention;

FIG. 2: is an illustration an exemplary Hubless Wheel [50], in accordance with some embodiments of the present invention;

FIGS. 3L, 3S & 3R: are illustrations of an exemplary HWPV [100], from a top view, wherein in FIG. 3L the exemplary HWPV is turning left, in FIG. 3S the exemplary HWPV is going straight and in FIG. 3R the exemplary HWPV is turning right, all in accordance with some embodiments of the present invention;

FIGS. 4A-4B: are illustrations of an exemplary HWPV [100], in its folded state, all in accordance with some embodiments of the present invention;

FIGS. 5A-5C: are illustrations of an exemplary Chassis [110] of a HWPV, viewed from different angles, all in accordance with some embodiments of the present invention;

FIGS. 6A-6B: are illustrations of an exemplary Rear Wheel [130] of a HWPV, viewed from different angles, all in accordance with some embodiments of the present invention;

FIG. 6C: is an illustration of an exemplary Rear Wheel [130] of a HWPV, viewed from different angles, showing the mounting of the Wheel on an exemplary Chassis [110], all in accordance with some embodiments of the present invention;

FIG. 6D: is an illustration of an exemplary Rear Wheel [130] of a HWPV, showing the connection of the Wheel to an exemplary Propulsion System [170], all in accordance with some embodiments of the present invention;

FIG. 7: is an illustration of an exemplary Asymmetric tire of a HWPV, in accordance with some embodiments of the present invention;

FIG. 8: is an illustration of an exemplary Thin-Section Bearing of a HWPV, in accordance with some embodiments of the present invention;

FIG. 9: is an illustration of an exemplary valve stem [138+168] of a HWPV, in accordance with some embodiments of the present invention;

FIG. 10A: is an illustration of an exemplary Front Hubless Wheel [160] of a HWPV, in accordance with some embodiments of the present invention;

FIG. 10B: is an illustration of an exemplary Front Hubless Wheel [160] of a HWPV, with portion of Interface Assembly [143], portion of Chassis [110] and Front Footstand [150], showing exemplary configuration of these components, all in accordance with some embodiments of the present invention.

FIG. 10C: is an illustration of an exemplary Front Hubless Wheel [160] of a HWPV, showing the connection of the Wheel to an exemplary Interface Assembly [143], all in accordance with some embodiments of the present invention;

FIGS. 11A-11B: are illustrations of an exemplary Steering Assembly [140] of a HWPV, connected to a Hollow Axle [164], from different viewing angles, all in accordance with some embodiments of the present invention;

FIGS. 11C-11F: are a series of illustrations of an exemplary Steering Assembly [140], showing the connections and relative position of the Steering Assembly to the Chassis [110], Front Wheel [160] and Front Footstand [150] in stages, wherein FIG. 11C includes the Assembly [140] and Front Hollow Axle [164], in FIG. 11D the Chassis [110] is added, in FIG. 11E the Front Footstand [150] is further added and in FIG. 11E the Front Wheel [160] is yet further added, all in accordance with some embodiments of the present invention;

FIG. 12A: is an illustration of an exemplary HWPV including a Joint [141-J] adapted to facilitate sideward motion of one of the Handlebars [141], all in accordance with some embodiments of the present invention;

FIG. 12B: is an illustration of an exemplary HWPV including a Joint [141-J] adapted to facilitate sideward motion of one of the Handlebars [141], all in accordance with some embodiments of the present invention;

FIG. 13A: is an illustration of an exemplary 4-Bar Linkage System [141-4B], in accordance with some embodiments of the present invention;

FIG. 13B: is an illustration of exemplary Handlebars [141] including a 4-Bar Linkage system [141-4B], showing the folding operation of the Handlebars by means of the 4-Bar linkage system, in accordance with some embodiments of the present invention;

FIGS. 13C-13E: are each a series of illustrations of a detail of an exemplary 4-Bar Linkage System corresponding to the series of illustrations in FIG. 13A, wherein FIG. 13E further includes a locking mechanism [141-L], all in accordance with some embodiments of the present invention;

FIG. 14A: is an illustration of an exemplary pivotal mounting on a Chassis [110], of a Steering Assembly [140] connected to a Hollow Axle [164], all in accordance with some embodiments of the present invention;

FIG. 14B: is an illustration of an exemplary pivotal mounting on a Chassis [110], of a Steering Assembly [140] connected to a Hollow Axle [164] further showing an exemplary Front Footstand [150] also mounted on the Chassis, all in accordance with some embodiments of the present invention;

FIGS. 14R, 14S & 14L: are illustrations of an exemplary Steering Assembly [140] connected to an exemplary Front Hubless Wheel [160], mounted on an exemplary Chassis which in turn is connected to an exemplary Front Footstand [150]—wherein in FIG. 3R the illustration demonstrates a right turn, in FIG. 3S the illustration demonstrates going straight and in FIG. 3L the illustration demonstrates a left turn, all in accordance with some embodiments of the present invention;

Figure 15R:
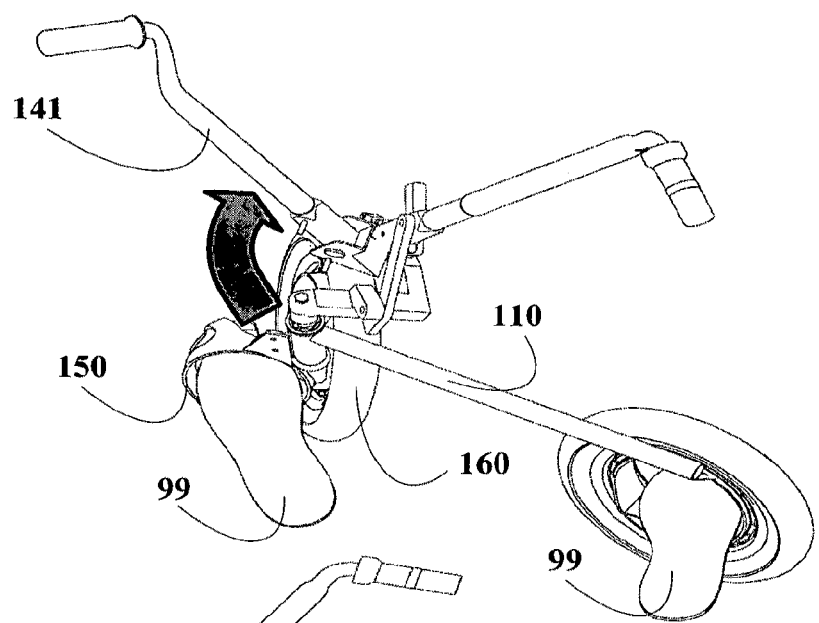
Figure 15S:
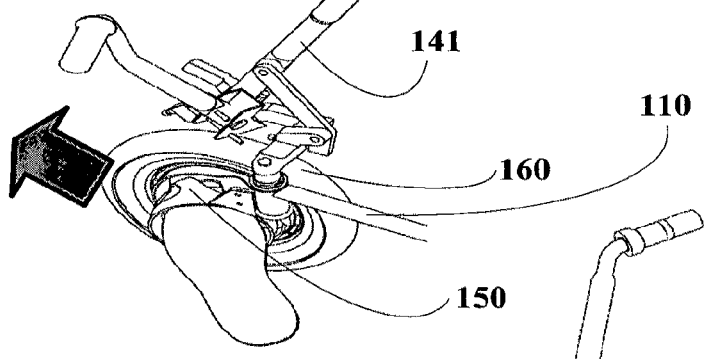
Figure 15L:
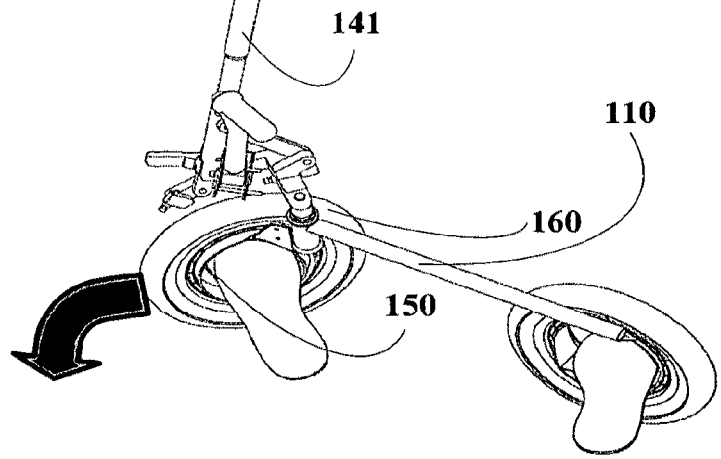
Figure 16R:
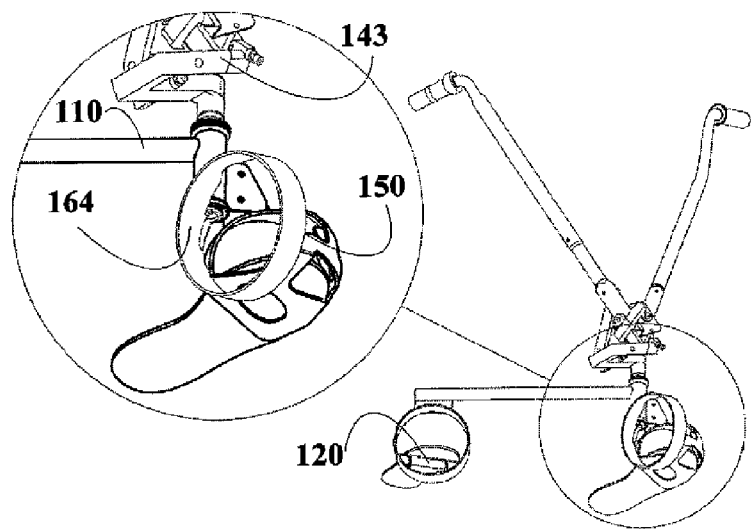
Figure 16S:
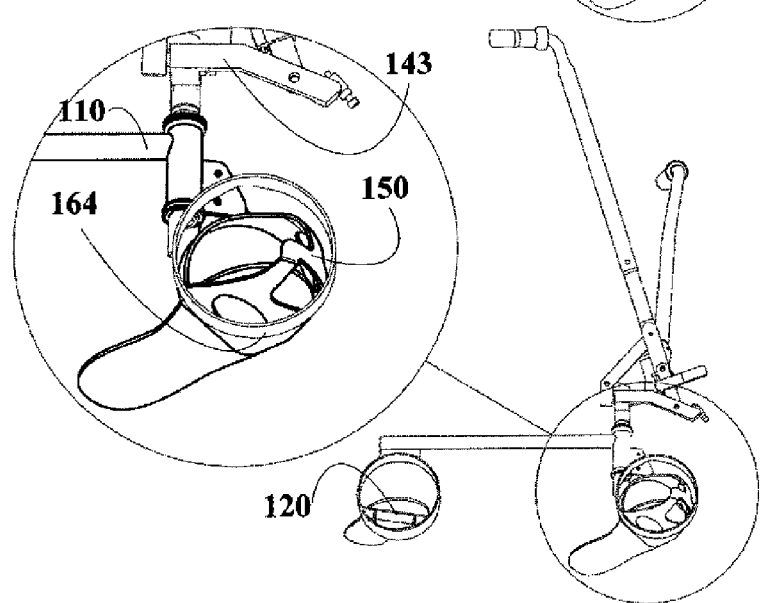
Figure 16L:
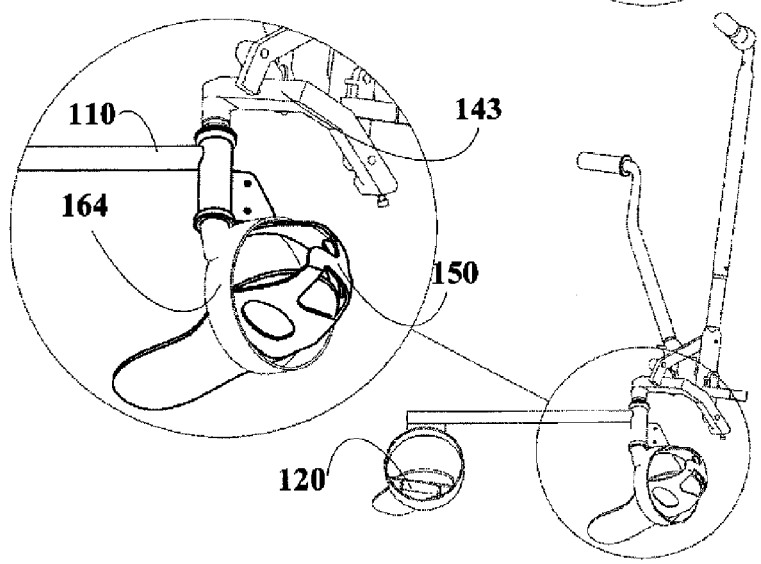
Figures 17L, 17R, 17S:
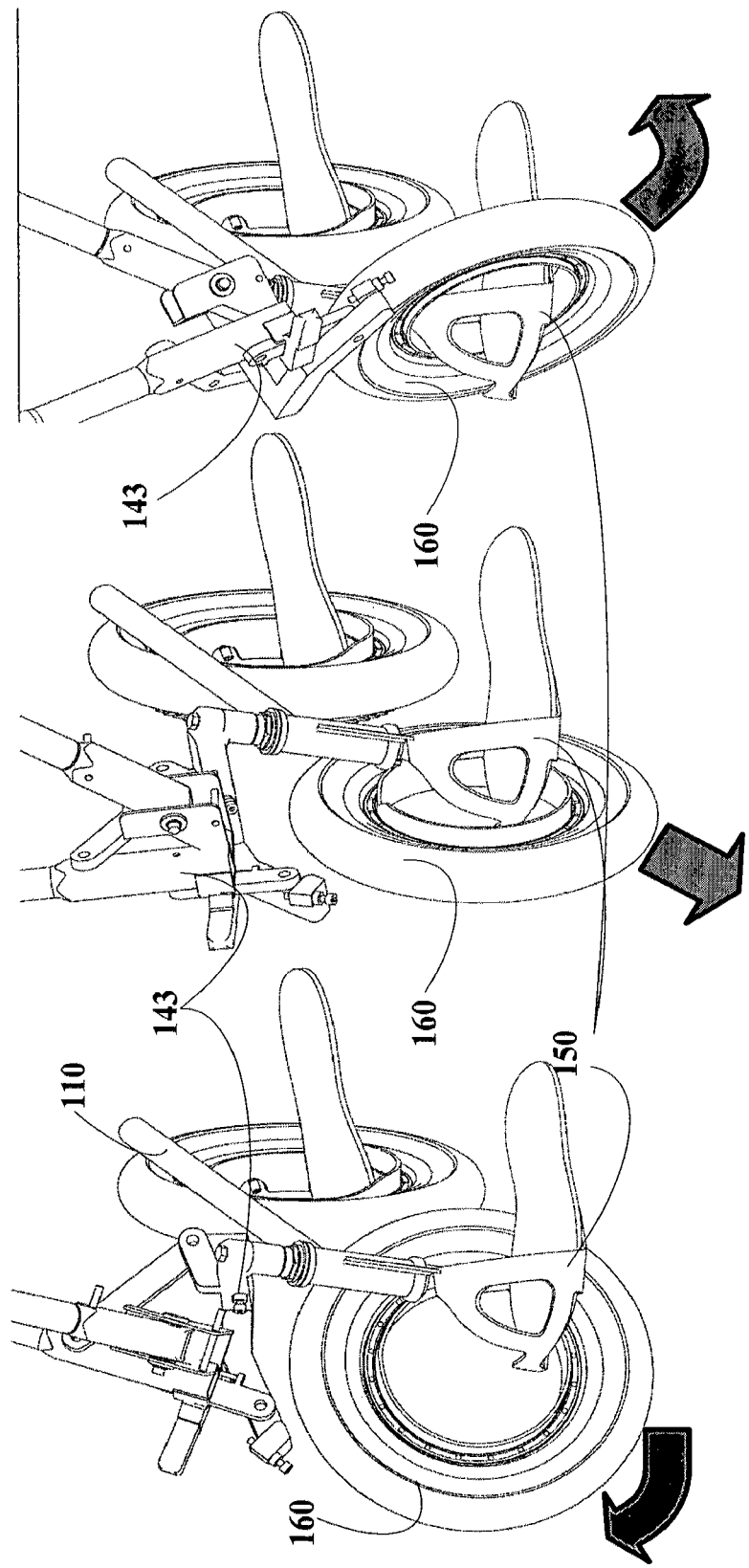

FIGS.* 15R, 15S & 15L: are illustrations of an exemplary HWPV [100], from a top view, wherein in FIG. 15R the exemplary HWPV is turning right, in FIG. 15S the exemplary HWPV is going straight and in FIG. 15L the exemplary HWPV is turning left, all in accordance with some embodiments of the present invention;

FIGS.* 16R, 16S & 16L: are illustrations of an exemplary Steering Assembly [140] connected to an exemplary Front Hollow Axle [164], mounted on an exemplary Chassis [110] which in turn is connected to an exemplary Front Footstand [150]—wherein in FIG. 16R the illustration demonstrates a right turn, in FIG. 16S the illustration demonstrates going straight and in FIG. 16L the illustration demonstrates a left turn, all in accordance with some embodiments of the present invention;

FIGS.* 17R, 17S & 17L: are illustrations of an exemplary HWPV [100], from a perspective view, wherein in FIG. 17R the exemplary HWPV is turning right, in FIG. 17S the exemplary HWPV is going straight and in FIG. 17L the exemplary HWPV is turning left, all in accordance with some embodiments of the present invention;

* some of the Drawings include illustrations of Footprints [see 99 in FIG. 15R] standing upon the Footstands. It should be understood that these footprints are intended for demonstrative purposes only and do not illustrate a component of a HWPV.

FIG. 18: is an illustration of an exemplary HWPV [100], including a model of a rider for demonstrative purposes, and showing the angle (α) between the diametral plane of the wheels of the exemplary HWPV and the steering axis, all in relation to the road when driving straight and all in accordance with some embodiments of the present invention; and FIG. 19: is a group of illustrations of an exemplary Rear Hubless Wheel [130] including a Braking Mechanism [190], all in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

It should be understood that the accompanying drawings are presented solely to elucidate the following detailed description, are therefore, exemplary in nature and do not include all the possible permutations of the present invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

It should be understood that numerous embodiments of the present invention are described herein by way of example. These embodiments, by their exemplary nature should be viewed as illustrating certain aspects and features of the present invention and should not be considered to encompass the many possible variations of the present invention.

In the following detailed description references to the figures appear in brackets. Numbers or letters appearing in brackets, e.g. [500], excluding paragraph numbers, should be understood to refer to elements marked within the figures by the same number and/or letter which appears in the brackets.

The present invention relates to components, arrangements and assembly of a personal vehicle and methods for producing same. According to some embodiments of the present invention, there may be provided a personal vehicle [FIG. 1A-1E, 100] including one or more "hubless wheels" (an HWPV). "Hubless Wheel" [FIG. 2, 50] may be defined as: a wheel with a hollow axle [54], i.e. a wheel having an empty space at its center [57]. * It should be noted that a "hubless" wheel may actually have a hub [58]. The hub of a hubless wheel may simply be larger than the hub of an ordinary wheel, often nearly as large as the outer rim of the wheel [53], leaving space for a hollow axle 1541, such that a round empty space [57] may be attained at the center of the wheel where the hub of an ordinary wheel resides. Hence, the somewhat misleading name—"hubless wheel"). According to further embodiments of the present invention, a HWPV may further include one or more footstands [120+150], which footstands may be mounted such that they reside within the center of a hubless wheel [see FIG. 1B], such that a rider of the HWPV standing on the footstands is essentially standing with his/her feet within the wheels of the HWPV [see FIGS. 1A+18]. Accordingly, the wheels may rotate around one or more of the footstands and one or more of the feet of a rider of the HWPV to facilitate forward/backward movement of the HWPV.

Furthermore, when a rider of the HWPV is standing vertically on the footstands [see FIG. 1A], a combined rider/vehicle center of gravity which is directly above the line connecting the contact points between the wheels and the road (which is necessary in order to maintain lateral balance), may be achieved by tilting the HWPV to the side opposing the rider (creating a "V" between the rider and the vehicle). Accordingly, the HWPV may be tilted to the side when a rider of the vehicle is standing vertically on the footstands and driving forward [see FIGS. 1A+18]. As a result, when the HWPV is being ridden by a rider standing vertically on the footstands, the common diametral plane of the wheels may not be perpendicular to the road [see FIG. 18] (i.e. the axis of rotation of the wheels may be at an angle (not parallel) to the road). Components of the HWPV, such as the tires, steering assembly or bearings, may be configured to account for the angled position of the vehicle while moving. For example, thin section bearings [FIG. 8] suitable to support the angled forces applied to the bearings of a vehicle tilted sideways may be used, asymmetric tires [FIG. 7] suitable to be ridden at an angle may be used, and so on.

According to some embodiments of the present invention, a Steering Assembly [140] may be attached to the front wheel/axle of a HWPV [see FIGS. 11A-11B] or to the front footstand, which steering assembly may include handlebars or any other steering mechanism adapted to facilitate the turning of the front wheel of the HWPV. Accordingly, in embodiments in which the steering assembly is attached to the front wheel/axle of the HWPV, the front wheel may rotate/spin around the front footstand in the longitudinal direction when the HWPV is moving forward or backwards) and may further rotate around the front footstand on the lateral plane (when the HWPV is turning) [see FIGS. 14A-17L]. According to some embodiments of the present invention, the Front Footstand, although being positioned within the center of the front wheel, may not inhibit the wheel from rotating along its diametral plane (forward/backward movement of the HWPV), by virtue of the hollow axle of the hubless wheel, and may further, by virtue of having minimal to zero contact with the front wheel, may not inhibit the wheel from rotating sideways around the steering axis (turning of the HWPV) nor, by the same token, will the turning of the front wheel affect the position of the footstand in relation to a rider, i.e. the turning of the steering assembly may turn the front wheel sideways around the front footstand, turning the vehicle, while the front footstand remains in place [see FIGS. 15R-17L]. FIGS. 14A-17L illustrate an exemplary configuration of the Front Footstand [150], Chassis [110], Steering Assembly [140] and Front Hubless Wheel [130] having the above described characteristics. FIGS. 14A-14R contain a series of illustrations in which an exemplary connection of the Steering Assembly [140] to the Front Hollow Axle [164] and Chassis [110] is first shown [FIG. 14A], then the Front Footstand [150] is added [FIG. 14B] and finally the entire Front Hubless wheel is added [FIG. 14R]. FIGS. 14R-17L contain 4 series of illustrations showing the exemplary configuration from a different viewing perspective in each series, wherein each series consists of one illustration of a right turn [R], one going straight [S] and one turning left [L]. Note, FIGS. 15R-17L include illustrations of Footprints [see 99 in FIG. 15R] standing upon the Footstands. It should be understood that these footprints are intended for demonstrative purposes only and do not illustrate a component of a HWPV.

According to further embodiments of the present invention, the steering assembly 140 may be asymmetric and further, in contrast to standard personal vehicles, may meet the front wheel at an angle [see FIG. 18], such that the steering axis may be at a sideways angle to the diametral plane of the front wheel, i.e. the steering axis may not reside within the diametral plane of the front wheel, yet at the same time may not reside within a plane parallel to the diametral plane of the front wheel, such that it intersects the diametral plane of the front wheel at a sideward angle. According to further embodiments of the present invention, the steering mechanism may be adapted to fold to allow for easier storage and transport of the HWPV [see FIGS. 13A-13E].

According to yet further embodiments of the present invention, an engine [170] may be mounted on a HWPV (e.g. an electric motor, an internal combustion engine, etc.), which engine may be adapted to propel the HWPV, i.e. a HWPV may be motorized.

According to some embodiments of the present invention there may be provided a HWPV [100] comprised of:

A). A Chassis [110] which may form the basic structure of the HWPV, such as a scooter like structure and which Chassis may be fabricated from any rigid material, such as a steel alloy, hard plastic, fiberglass, carbon fiber, aluminum, any other material having the necessary strength and/or any combination thereof, and may be comprised of:

i. A horizontal element [111](FIGS. 5A). For example, some HWPV's according to some exemplary embodiments of the present invention (hereinafter referred to as "Exemplary HWPV" or "EHWPV"—wherein reference is made in singular for convenience, however, is intended to include plural), may comprise a horizontal tube shaped element [111];

ii. Rear mounts [112] for a footstand and/or a wheel. For example, an EHWPV may comprise a rear mount for a circular component, which circular component [134] may both serve as a hollow axle for a hubless wheel and as a mount for a rear footstand. This circular component may be considered by some part of the chassis, by some part of the wheel and yet by some part of the footstand. Regardless, this circular component may form a rigid connection between the rear of an EHWPV chassis, an axle for a given hubless wheel, and a footstand, such that the position of the Axle and footstand may be fixed in relation to the chassis and positioned in the center of the given hubless wheel;

iii. A Front Mount [113] for a pivotal connection to a steering assembly. For example, an EHWPV may comprise a tubular mounting for a steering assembly [113] attached to the front of the horizontal element;

iv. A Front Mount [114] for a Footstand, which Front Mount may also be attached to the front end of the horizontal element. For example, an EHWPV may comprise a flat rigid component protruding from the Front Mount for the steering assembly [114]. The flat rigid component may be adapted to connect to a Footstand, such that the position of the footstand may be fixed in relation to the chassis, whereas the pivotal mount for the steering assembly [113] allows it to turn in either direction without affecting the position of the footstand [see FIG. 14A+14B];

v. An Engine Mount [115](FIG. 5B), which Engine Mount may be adapted to support an engine and may be connected to the Horizontal Element, such that an engine mounted on the Engine Mount is positioned to propel the vehicle (i.e. configured and connected to the Horizontal Element such as to facilitate the operation of an engine mounted on it). For Example, an EHWPV may comprise an Engine Mount adapted to support an electric motor [170], and connected towards the rear of the Horizontal Element, in front of the Rear Mounts, such that an electric motor mounted upon it will align properly with a sprocket of a rear wheel it may transfer rotational force to by means of a chain or similar component [see FIG. 6D];

vi. A Mount for a power/fuel supply [116], which Fuel Supply Mount may be adapted to support a fuel supply (e.g. battery, gas tank, etc.) for a given engine mounted on the Engine Mount, and may be connected to the Horizontal Element, such that a fuel supply mounted on Fuel Supply Mount is positioned to provide fuel/power to the given engine. For example, a EHWPV may comprise a Fuel Supply Mount [116] adapted to support a battery and connected to the Horizontal Element adjacent to the Engine Mount;

vii. A Handle for lifting/carrying the HWPV [117], which handle may be configured and connected such that a user may lift and carry the HWPV in its folded state and/or in its open state; and viii. Mounts for any other accessory or component desired.

B). A Rear Footstand [120] adapted to support a foot of a rider,' which Rear Footstand may be attached to the rear portion of the Chassis and may further include a circular circumference which may be adapted to serve as an axle for a hubless wheel. Alternatively, the Rear Footstand may be mounted within a Rear Wheel, which is in turn connected to the rear portion of the Chassis. Note, regardless; the Rear Wheel may rotate around the Rear Footstand along its diametral plane. The Rear Footstand may be fabricated from any rigid material, such as a steel alloy, hard plastic, fiberglass, carbon fibre, aluminum, any other material having the necessary strength and/or any combination thereof. Furthermore, the Rear Footstand may include a softer component (e.g. a rubber pad) located where the foot of a rider is intended to stand. For example, a EHWPV may comprise a Rear Footstand [120] rigidly connected to a Rear Mount on the Chassis, such that the Rear Footstand is fixed in relation to the Chassis and supported by it, and further comprises a circular circumference [134] which may be adapted to serve as an axle for a hubless wheel.

C). A Rear Hubless Wheel [130], which may be comprised of;

i. A Tire or similar element [131], which tire or similar element may be asymmetric in relation to its diametral plane [see FIG. 7], such that it is better adapted to be ridden at an angle (not perpendicular to the road) For example, an EHWPV may comprise a tire [131] which, when viewed in a cross section [FIG. 7], is thicker on one side (the side which is in more contact with the road as a result of the angle);

ii. An Inner Tube [132], which may include a valve stem [138] located on the side of the inner tube [see FIG. 9] to avoid obstructing the center of the hubless wheel;

iii. An Outer Rim [133] on which the tire may be mounted;

iv. A Hollow Axle [134] which may be larger than the axle of a standard wheel and hollow, giving the wheel its "hubless" nature, and on which Hollow Axle the Outer Rim may be concentrically mounted by the use of bearings or another rolling element [135], such that the Outer Rim [133], and with it the Tire [131], are free to rotate around the Hollow Axle [134]. The Hollow Axle [134] may be connected to the Rear Footstand [120] (mounted on the footstand) or directly to the Chassis [110]. Optionally, the circular circumference of the Rear footstand may serve as the Rear Hollow Axle; and v. A Sprocket [136] or similar component, which may be rigidly connected to the Outer Rim [133] and may be adapted to cause the rotation of the Rear Wheel when force is applied from an engine, via a chain, belt or similar component.

According to some embodiments of the present invention, the Outer Rim may be separated from the Hollow Axle by thin section bearings [see FIG. 8] or another rolling element adapted to carry and withstand lateral forces exerted on the rolling element as a result of a tilt of the wheel to one side.

For example, an EHWPV may comprise a Rear Hubless Wheel [130] comprised of a tire [131] mounted on an outer rim [133] which Outer Rim [133] is in turn mounted on a Hollow Axle [134] by means of thin section bearings [135], and which Hollow Axle [134] may actually be the circular circumference of a Rear Footstand [120], which Footstand is rigidly connected to the Chassis [110]. The Outer Rim [133] may be separated from the Hollow axle [134] by thin section bearings [135], such that it is free to rotate around the Hollow Axle [134]. The Rear Hubless Wheel [130] of an EHWPV may further comprise a sprocket [136] rigidly connected to the Outer Rim [133] from one side, such that a rotation of the sprocket [136] will cause a rotation of the Outer Rim [133] and with it the Wheel [130].

D). A Steering Assembly [140], which may be pivotally mounted on the front portion of the Chassis [see FIG. 14A] and may comprise:

i. Handlebars [141] or any other steering control element. The Handlebars or other steering mechanism may include folding elements [see FIGS. 13A-13E]. According to further embodiments of the present invention, the folding elements within the Handlebars or other steering mechanism may be adapted to "lock" in an open and/or closed state, i.e. may further include locking elements [141-L] designed to prevent/allow the folding operation of their folding elements. These locking elements may be user actuated [141-R] and/or automatic (e.g. spring activated [141-S]).

According to further embodiments of the present invention, the Handlebars may be adapted to be held by a rider standing to the side of the handlebars, e.g. the handlebar closer to the rider may be shorter than the other.

According to yet further embodiments of the present invention, the Handlebars may include one or more Joint(s) [141-J] adapted to facilitate sideward motion of one or more handlebars, such that a given handlebar may be adapted to be moved towards the other [see FIGS. 12A-12B], while standing or while the vehicle is in motion;

For example, an EHWPV may comprise Handlebars which may include a 4-bar linkage system [141-4B] connecting them to the rest of the Steering Assembly, adapted to allow the folding and unfolding operation of the handlebars, yet further adapted to "geometrically lock" in its fully opened and/or fully closed states. The four-bar linkage system may comprise four bars connected by folding joints in a quadrilateral shape [see FIG. 13C in which the quadrilateral shape is accentuated by a black dotted line]. By nature, in such a configuration the handlebars may fold and unfold, causing one vertex of the quadrilateral to shift inwards when folding [see FIG. 13C-1] and the other vertex to shift inwards when unfolding [see FIG. 13C-5], wherein when a vertex of the trapezoid crosses the line connecting two other vertexes of the quadrilateral, a "geometric lock" is created (the basic principle of the four-bar linkage system). It should be noted that the geometric lock associated with a four-bar linkage system may release when sufficient pressure is applied against it. Accordingly, the Handlebars of an EHPWV may further include one or more "locking" mechanisms [141-L], adapted to inhibit, when activated, the release of the geometric lock created when the handlebars are fully open and/or fully closed. The Locking Mechanisms may be spring activated [141-S] and may further include one or more release mechanisms [141-R], adapted to release the locking mechanisms after they have been activated. Detailed illustrations of an example of such a 4-Bar linkage system, in a series of different stages of folding, are presented in FIGS. 13A-13E, wherein FIGS. 13A, 13B and 13E show the stages of a complete system and FIGS. 13C-13D show the same stages of a system without a locking mechanism.

ii. A Mount for a front wheel or a Front Footstand [114]; and iii. An Interface Assembly [143], which Interface Assembly may be mounted on the front of the Chassis [110] and may interface between the steering mechanism [141], a Front Hollow Axle [164] and the pivotal connection to the Chassis [113]. The Interface Assembly may comprised of a set of interconnected mechanical components, fabricated from any rigid material, such as a steel alloy, hard plastic, fiberglass, carbon fibre, aluminum, any other material having the necessary strength and/or any combination thereof and may be designed and configured such that when mounted on the Chassis and connected to a front wheel the steering mechanism pivots freely to the sides in relation to the Chassis, while transferring pivotal motion to the front wheel [see FIG. 14A], causing the HWPV to turn if it is in forward or backward motion. According to further embodiments of the present invention, the Interface Assembly may be asymmetric in relation to the vertical plane, when the HWPV is standing vertically, such that pivotal motion transferred to the front wheel is transferred at an angle to the wheels diameter [see FIG. 18], i.e. the steering axis may be at an angle to the diametral plane of the front wheel. For Example, an EWHPV may comprise an Interface Assembly [143] comprised of a set of interconnected rigid bars, tubes and joints, pivotally mounted on the Chassis [110] by means of a rigid tube [143-T], which tube is one of the components of the Interface Assembly and which runs through a tubular Front Mount on the front of the Chassis [113], thus fixing the location of the Interface Assembly in relation to the Chassis, while not inhibiting the Interface Assembly (and with it the Steering Assembly) from rotating to the sides [see FIG. 14A] to facilitate steering of the EHWPV. The Interface Assembly of an EHWPV may further comprise a mount for handlebars, configured such that handlebars may be mounted on the Interface Assembly and control the pivotal steering motion of the Interface Assembly. Furthermore, the Interface Assembly of an EHWPV may be asymmetric in relation to the vertical plane when the EHWPV is standing vertically, such that pivotal motion transferred to the front wheel is transferred at a 15° angle to the wheels diameter, i.e. the steering axis may be at a 15° angle to the diametral plane of the front wheel. Accordingly, the tubular component of the Interface Assembly [143-T] of an EWHPV which is mounted within the Front Mount [113] and transfers the pivotal motion of the Steering Assembly to a given Front Wheel, may meet the given wheel at a 15° angle to the given wheel's diameter [see FIG. 18].

FIGS. 11A-11F illustrate an exemplary configuration of the Steering Assembly [140], Front Footstand [150], Chassis [110], and Front Hubless Wheel [130] in stages, wherein an exemplary Steering Assembly [140] connected to a Front Hollow Axle [164] is first shown from three different viewing perspectives [FIGS. 11A-11C], a Chassis [110] is then added [FIG. 11D], then the Front Footstand [150] is added [FIG. 11E] and finally the entire Front Hubless wheel is added [FIG. 11F].

E). A Front Footstand [150], which may be mounted on the front bottom portion of the Chassis [114]. Alternatively, the Front Footstand may be mounted directly to the Steering Assembly and within a Front Wheel, and may include a circular circumference which may be adapted to serve as an axle for a hubless wheel. The Front Footstand may be fabricated from any rigid material, such as a steel alloy, hard plastic, fiberglass, carbon fibre, aluminum, any other material having the necessary strength and/or any combination thereof. Furthermore, the Front Footstand may include a softer component (e.g. a rubber pad) located where the foot of a rider is intended to stand.

For example, an EWHPV may comprise a Front Footstand [150], rigidly connected to a Front Mount [114] on the front side of the tubular Steering Assembly Mount [113]. The Front Footstand of an EHWPV, when connected to the Front Mount may reside within a Front Hubless Wheel, wherein the Front Footstand does not inhibit a Front Hubless Wheel mounted on the EHWPV from rotating around the Front Footstand along its diametral plane (forward/backward motion) and further does not inhibit a Front Hubless Wheel mounted on the EHWPV from turning to the sides (steering motion).

F). A Front Hubless Wheel [160], which may be comprised of;
i. A Tire or similar element [161], which tire or similar element may be adapted to be ridden at an angle, such as by being asymmetric in relation to its diametral plane [see FIG. 7], such that it is better adapted to be ridden at an angle (not perpendicular to the road).

For example, an EHWPV may comprise a tire [161] which, when viewed in a cross section [see FIG. 7], is thicker on one side (the side which is in more contact with the road as a result of the angle) than the other side (the side which less in contact with the road.

ii. An Inner Tube [162], which may include a valve stem located on the side of the inner tube [168] to avoid obstructing the center of the hubless wheel;

iii. An Outer Rim [163] on which the tire may be mounted;

iv. A Hollow Axle [164] on which the Outer Rim [163] may be concentrically mounted by the use of bearings or another rolling element [165] such that the Outer Rim [163], and with it the Tire [161], are free to rotate around the Axle [164]. The Front Hollow Axle may be larger than the axle of a standard wheel and hollow, giving the wheel its "hubless" nature. The Front Hollow Axle [164] may be connected directly to the Steering Assembly [140] [see FIG. 11A], transferring the pivotal motion of the steering assembly to the Front Wheel, causing the Front Wheel to turn around the Front Footstand. Optionally, the circular circumference of the Front Footstand may serve as the Front Hollow Axle and accordingly, the circular circumference of the Front Footstand may connect the wheel to the Steering Assembly.

For example, an EHPWV may comprise a Hollow Axle [164] on which the Outer Rim [163] may be mounted by the use of bearings [165] such that the Outer Rim [163], and with it the Tire [161], are free to rotate around the Axle [164]. The Hollow Axle of an EHWPV may be rigidly connected to the Steering Assembly, such that the Hollow Axle turns with the Steering Assembly, around the Front Footstand [see FIG. 15R-17L].

According to some embodiments of the present invention, the Outer Rim [163] may be separated from the Hollow Axle [164] by thin section bearings [165] [see FIG. 8] or another rolling element adapted to carry and withstand lateral forces exerted on the rolling element as a result of a tilt of the wheel to one side. Most radial ball bearings are designed so that as the bore size increases, the width and the thickness of the bearing change proportionately. In the case of thin section bearings the cross section may remain the same as the bore diameter increases. The thin section bearing family may be made up of 12 primary cross section sets ranging from $3/16"$ to $1"$ and with bore sizes ranging from $1"$ to over $40"$. The combination of a large bore diameter in proportion to the small cross section makes these parts appear "thin" in comparison to standard ball bearings, hence the name.

G). A Propulsion System [170], which may be mounted on the Chassis and/or the Rear Wheel or Footstand, and may be adapted to propel the HWPV forward and/or backward by any method known today or to be devised in the future.

For example, an EWHPV may comprise an electric motor [170] mounted on the Engine Mount [116], which motor may be adapted to rotate the Rear Wheel [130] by use of a chain encircling the sprocket [136] of the rear wheel.

H). An Acceleration Control Element, such as a throttle, which control element may be adapted to control the supply of power to the engine or otherwise control the amount of force exerted by the engine to propel the vehicle forward/backward. For example, an EHWPV may comprise an electric throttle mounted on one of the handlebars, connected to the Engine by means of a cable and adapted to regulate the flow of electric power to the motor;

I). A Brake [see FIG. 19] adapted to cause deceleration of the HWPV, which may be comprised of any known braking mechanism or any braking mechanism to be devised in the future.

For Example, an EHWPV may comprise an internal caliper disk type brake [FIG. 19], including a disk [191] mounted on the Rear Wheel [130], and a caliper [192], which caliper may reside beneath the Rear Footstand [120]; and J). A Brake Control Element adapted to facilitate actuation and/or regulation of the braking operation of the Brake by a rider of the HWPV, such as a brake handle or pedal.

For Example, an EHWPV may comprise a brake handle mounted on one of the handlebars, connected to the Brake by means of a cable and adapted to actuate the internal caliper of the brake.

It should be understood by one of ordinary skill in the art, that the above described combination of discreet elements is one of many possible combinations of elements possible to fabricate a personal vehicle, in accordance with the principles of this invention.

It should also be understood by one of skill in the art that some of the functions described as being performed by a specific component of the system may be performed by a different component of the system in other embodiments of this invention.

The present invention can be practiced by employing conventional tools, methodology and components. Accordingly, the details of any such tool, component and methodology are not set forth herein in detail. In the previous descriptions, numerous specific details are set forth, in order to provide a thorough understanding of the present invention. However, it should be recognized that the present invention may be practiced without resorting to the details specifically set forth.

In the description and claims of embodiments of the present invention, each of the words, "comprise" "include" and "have", and forms thereof, are not necessarily limited to members in a list with which the words may be associated.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein. It should be understood that the above exemplary embodiments (EHWPV) are intended solely to exemplify the principles and teachings of the present invention and therefore, should not be considered to encompass the full scope of the present invention in any way. It should be clear to anyone of ordinary skill in the art that many other examples of the present invention are possible.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. A two wheeled personal vehicle comprised of:
    a chassis;
    at least one hubless wheel mounted on said chassis;
    a footstand positioned within said hubless wheel and wherein said footstand is rigidly connected to said chassis; and
    a steering assembly mounted on said chassis and adapted to turn said wheel.

2. The vehicle according to claim 1, comprising at least two hubless wheels.

3. The vehicle according to claim 2, further comprising a second footstand positioned within one of said hubless wheels and wherein said second footstand is rigidly connected to said chassis.

4. The vehicle according to claim 1, wherein said hubless wheel is adapted to rotate around said footstand around more than one axis.

5. The vehicle according to claim 1, wherein a steering axis on which said steering assembly turns a given wheel is at an offset angle from the diametral plane of the given wheel.

6. The vehicle according to claim 1, further comprising thin section bearings configured to facilitate the rotation of at least one of said hubless wheels.

7. The vehicle according to claim 1, further comprising one or more adaptations to facilitate forward driving of the vehicle while the vehicle is tilted to one side, wherein said adaptations are selected from the group of adaptations consisting of:
    a. mounting of tires on said hubless wheels, which tires are asymmetric in relation to their diametral plane;
    b. use of wheels, which wheels are asymmetric in relation to their diametral plane;
    c. use of thin section bearings to facilitate rotation of said hubless wheels;
    d. a steering assembly adapted to steer said vehicle by turning one of said wheels on a steering axis which is at an offset angle to the diametral plane of the wheel it is turning; and
    e. a steering assembly adapted to be manipulated by a rider of said vehicle, standing on said footstand while said vehicle is tilted to one side and moving forward.

8. The vehicle according to claim 1, wherein said vehicle is configured such that when a rider of the vehicle is standing vertically on said footstands and the combined rider/vehicle center of gravity is positioned above the line connecting the contact points between said wheels and the ground, the axis of rotation of said wheels is substantially non-parallel to the ground.

9. The vehicle according to claim 1, further comprising an engine.

10. The vehicle according to claim 1, further comprising asymmetric tires mounted on at least one of said hubless wheels.

11. The vehicle according to claim 10, wherein said tire is asymmetric in relation to its diametral plane.

12. The vehicle according to claim 1, further comprising at least one valve stem connected to a tire such that said valve stem protrudes to the side of the tire.

13. The vehicle according to claim 1, wherein said steering assembly comprises at least one handlebar.

14. The vehicle according to claim 13, wherein said handlebar is adapted to fold and unfold into at least two different states and comprises at least one locking mechanism adapted to inhibit the folding operation of said handlebar when said locking mechanism is engaged.

15. The vehicle according to claim 13, further comprising a second handlebar.

16. The vehicle according to claim 15, wherein said second handlebar is adapted to fold towards the other handlebar without affecting the steering of the vehicle.

17. The vehicle according to claim 1, further comprising a braking mechanism.

* * * * *